(12) United States Patent
Ancimer et al.

(10) Patent No.: US 9,512,761 B2
(45) Date of Patent: Dec. 6, 2016

(54) SYSTEMS AND METHODS FOR $NO_x$ REDUCTION AND AFTERTREATMENT CONTROL USING PASSIVE $NO_x$ ADSORPTION

(71) Applicant: Cummins Inc., Columbus, IN (US)

(72) Inventors: Richard J. Ancimer, Toronto (CA); Mert Geveci, Delmar, NY (US); Michael Haas, Columbus, IN (US); Alok Joshi, Columbus, IN (US); Krishna Kamasamudram, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 14/453,169

(22) Filed: Aug. 6, 2014

(65) Prior Publication Data

US 2015/0247437 A1  Sep. 3, 2015

Related U.S. Application Data

(60) Provisional application No. 61/946,227, filed on Feb. 28, 2014.

(51) Int. Cl.
*B01D 53/92* (2006.01)
*B01D 53/94* (2006.01)
(Continued)

(52) U.S. Cl.
CPC .............. *F01N 3/2066* (2013.01); *F01N 3/035* (2013.01); *F01N 3/103* (2013.01); *F01N 3/106* (2013.01);
(Continued)

(58) Field of Classification Search
CPC ..... B01D 53/92; B01D 53/94; B01D 53/9409; B01D 53/9481; F01N 3/18; F01N 3/20; F01N 3/2006; F01N 3/2066
See application file for complete search history.

(56) References Cited

U.S. PATENT DOCUMENTS 6,125,629 A   10/2000   Patchett
6,182,443 B1   2/2001   Jarvis et al.
(Continued)

FOREIGN PATENT DOCUMENTS

AT        291685 T   *  4/2005  ............. B01D 53/94
CN    104145096 A   * 11/2014  ........... F01N 3/2013
(Continued)

OTHER PUBLICATIONS

PCT/US2013/041959, International Search Report and Written Opinion, Sep. 23, 2013, 9 pages.
(Continued)

*Primary Examiner* — Timothy Vanoy
(74) *Attorney, Agent, or Firm* — Taft Stettinius & Hollister LLP

(57) ABSTRACT

Systems and methods for managing aftertreatment systems that include passive $NO_x$ adsorption devices and SCR catalyst elements are disclosed. Temperature generation devices upstream of the passive $NO_x$ adsorption devices facilitate control of the aftertreatment systems to improve fuel economy and $NO_x$ conversion efficiency.

73 Claims, 7 Drawing Sheets

(51) Int. Cl.
*F01N 3/18* (2006.01)
*F01N 3/20* (2006.01)
*F01N 13/00* (2010.01)
*F01N 3/035* (2006.01)
*F01N 3/10* (2006.01)

(52) U.S. Cl.
CPC .......... *F01N 3/2006* (2013.01); *F01N 3/2033* (2013.01); *F01N 13/009* (2014.06); *F01N 2610/02* (2013.01)

(56) References Cited

U.S. PATENT DOCUMENTS

| | | | |
|---|---|---|---|
| 6,182,444 | B1 | 2/2001 | Fulton et al. |
| 6,761,025 | B1 | 7/2004 | Gladden |
| 6,877,313 | B1 | 4/2005 | Phillips et al. |
| 6,912,847 | B2 | 7/2005 | Deeba |
| 6,996,975 | B2 | 2/2006 | Radhamohan et al. |
| 7,062,904 | B1 | 6/2006 | Hu et al. |
| 7,188,469 | B2 | 3/2007 | Bonadies et al. |
| 7,229,597 | B2 | 6/2007 | Patchett et al. |
| 7,264,785 | B2 | 9/2007 | Blakeman et al. |
| 7,334,400 | B2 | 2/2008 | Yan et al. |
| 7,377,101 | B2 | 5/2008 | Mital et al. |
| 7,485,272 | B2 | 2/2009 | Driscoll et al. |
| 7,614,220 | B2 | 11/2009 | Breuer et al. |
| 7,674,743 | B2 | 3/2010 | Gandhi et al. |
| 7,685,813 | B2 | 3/2010 | McCarthy, Jr. |
| 7,799,289 | B2 | 9/2010 | Robel |
| 7,805,929 | B2 | 10/2010 | Driscoll |
| 7,902,107 | B2 | 3/2011 | Patchett et al. |
| 7,998,423 | B2 | 8/2011 | Boorse et al. |
| 8,037,674 | B2 | 10/2011 | Kupe et al. |
| 8,158,067 | B2 | 4/2012 | Choi |
| 8,293,197 | B2 | 10/2012 | Winkler et al. |
| 8,381,514 | B2 | 2/2013 | Salanta et al. |
| 8,409,515 | B2 | 4/2013 | Ren et al. |
| 8,448,424 | B2 | 5/2013 | Huang et al. |
| 8,486,341 | B2 | 7/2013 | Driscoll et al. |
| 8,601,796 | B2 | 12/2013 | Hinz et al. |
| 8,997,461 | B2 | 4/2015 | Henry et al. |
| 2004/0118109 | A1 | 6/2004 | Gladden |
| 2004/0237507 | A1 | 12/2004 | Duvinage et al. |
| 2005/0069476 | A1 | 3/2005 | Blakeman et al. |
| 2005/0284134 | A1 | 12/2005 | Radhamohan et al. |
| 2006/0260296 | A1 | 11/2006 | Theis |
| 2007/0012032 | A1 | 1/2007 | Hu |
| 2007/0051096 | A1 | 3/2007 | Pfeifer et al. |
| 2007/0082783 | A1 | 4/2007 | Hu et al. |
| 2007/0089403 | A1 | 4/2007 | Pfeifer et al. |
| 2007/0122317 | A1 | 5/2007 | Driscoll et al. |
| 2008/0060348 | A1 | 3/2008 | Robel et al. |
| 2008/0072575 | A1 | 3/2008 | Yan |
| 2008/0196397 | A1 | 8/2008 | Yan |
| 2009/0031702 | A1 | 2/2009 | Robel |
| 2009/0133383 | A1 | 5/2009 | Shost |
| 2009/0173064 | A1 | 7/2009 | Ren et al. |
| 2009/0193794 | A1 | 8/2009 | Robel et al. |
| 2009/0222191 | A1 | 9/2009 | Andrasko |
| 2009/0293459 | A1 | 12/2009 | Shimomura et al. |
| 2010/0005783 | A1 | 1/2010 | Keppeler et al. |
| 2010/0024389 | A1 | 2/2010 | Gady et al. |
| 2010/0126150 | A1 | 5/2010 | Choi |
| 2010/0180579 | A1 | 7/2010 | Huang et al. |
| 2010/0180580 | A1 | 7/2010 | Boorse et al. |
| 2010/0242438 | A1 | 9/2010 | Mital |
| 2010/0242448 | A1 | 9/2010 | Mital |
| 2010/0250090 | A1 | 9/2010 | Jasinkiewicz et al. |
| 2010/0266471 | A1 | 10/2010 | Xu et al. |
| 2010/0319320 | A1 | 12/2010 | Mital et al. |
| 2010/0319324 | A1 | 12/2010 | Mital |
| 2011/0023463 | A1 | 2/2011 | Dobson et al. |
| 2011/0047970 | A1 | 3/2011 | Yezerets et al. |
| 2011/0138776 | A1 | 6/2011 | Huang et al. |
| 2011/0146252 | A1 | 6/2011 | Silver et al. |
| 2011/0162347 | A1 | 7/2011 | Katare et al. |
| 2011/0179777 | A1 | 7/2011 | Chandler et al. |
| 2011/0203262 | A1 | 8/2011 | Potter et al. |
| 2011/0265452 | A1 | 11/2011 | Geveci et al. |
| 2011/0283680 | A1 | 11/2011 | Gekas et al. |
| 2012/0023905 | A1 | 2/2012 | Yezerets et al. |
| 2012/0214663 | A1 | 8/2012 | Chigapov et al. |
| 2012/0324868 | A1 | 12/2012 | Kim et al. |
| 2013/0022511 | A1 | 1/2013 | Hayashi |
| 2013/0061576 | A1 | 3/2013 | Gonze et al. |
| 2013/0232958 | A1 | 9/2013 | Ancimer et al. |
| 2013/0294990 | A1* | 11/2013 | Koch ................. B01D 53/9477 423/213.5 |
| 2013/0305695 | A1 | 11/2013 | Henry et al. |
| 2013/0312392 | A1 | 11/2013 | Henry et al. |
| 2014/0090362 | A1 | 4/2014 | Eckhoff |
| 2015/0158019 | A1* | 6/2015 | Rajaram ............ B01D 53/9481 423/213.2 |
| 2015/0240682 | A1 | 8/2015 | Gupta et al. |
| 2015/0266002 | A1* | 9/2015 | Biberger ................. B01J 20/02 423/239.1 |
| 2015/0275730 | A1 | 10/2015 | Gupta et al. |
| 2016/0045867 | A1* | 2/2016 | Kearl ................. B01D 53/9418 423/213.2 |
| 2016/0084185 | A1* | 3/2016 | Theis .................... F01N 13/009 701/105 |

FOREIGN PATENT DOCUMENTS

| | | | | |
|---|---|---|---|---|
| DE | 19748561 A1 | * | 5/1999 | .............. C10L 10/02 |
| EP | 1452960 A1 | | 9/2004 | |
| EP | 2230001 A1 | | 9/2010 | |
| EP | 2279785 A2 | * | 2/2011 | ............. B01D 53/56 |
| EP | 2685061 A4 | * | 1/2015 | ........... F01N 3/2026 |
| FR | 3007794 A1 | | 1/2015 | ........... F02D 41/0275 |
| GB | 1212898 A | * | 11/1970 | ................ F01N 3/18 |
| JP | 2008190359 A | * | 8/2008 | ................ F01N 3/08 |
| WO | 2006131825 A1 | | 12/2006 | |
| WO | 2010094313 A1 | | 8/2010 | |
| WO | WO 2015/086905 A1 | * | 6/2015 | ........... F01N 3/2006 |

OTHER PUBLICATIONS

Aniket Gupta, Krishna P. Chilumukuru, Michael J. Cunningham, Govindarajan, Kothandaraman, Michael J. Ruth, Lasitha Cumaranatunge, Howard Hess, Aftertreatment Architecture and Control Methodologies for Future Light Duty Diesel Emission Regulations, Proceedings of the ASME 2014 Internal Combustion Engine Division Fall Technical Conference, Oct. 19-22, 2014, 7 pgs.

* cited by examiner

SYSTEMS AND METHODS FOR $NO_x$ REDUCTION AND AFTERTREATMENT CONTROL USING PASSIVE $NO_x$ ADSORPTION

CROSS-REFERENCE TO RELATED APPLICATION

The present application claims the benefit of the filing date of U.S. Provisional Application Ser. No. 61/946,227 filed on Feb. 28, 2014, which is incorporated herein by reference.

BACKGROUND

Effective operation of selective catalytic reduction (SCR) catalysts is of increasing interest to meet modern internal combustion engine emissions standards. The effectiveness of a typical SCR catalyst in removing oxides of nitrogen ($NO_x$) emissions is sensitive to the temperature of the exhaust gas at the inlet to the SCR catalyst. Under cold start conditions and low temperature phases of transient cycles, an SCR catalyst may not reach effective reduction temperatures to reduce $NO_x$ to N2 even if ammonia is stored on the catalyst and reductant is available for dosing into the exhaust flow.

Typical diesel aftertreatment systems include a diesel oxidation catalyst (DOC) and a diesel particulate filter (DPF) in addition to the SCR catalyst. The DOC is responsible for oxidation of hydrocarbons (HC), carbon monoxide (CO), and nitric oxide (NO). The DPF can also convert NO to nitrogen dioxide ($NO_2$) under certain operating conditions. The conversion of NO to $NO_2$ upstream of the SCR catalyst can improve feed gas composition to the inlet of the SCR catalyst for efficient $NO_x$ conversion. However, in general, the DOC and DPF do not operate efficiently at low temperature conditions to convert NO to $NO_2$ in an oxidation reaction. While thermal management of the exhaust flow can be provided to increase exhaust temperatures to an effective operating range, these techniques are often associated with a fuel economy penalty. Also, reductant injection upstream of the SCR catalyst in low temperature conditions can create reductant deposits. Reductant deposits can degrade the $deNO_x$ ($NO_x$ reduction) performance of the SCR catalyst, increase back pressure during engine operation, and decrease fuel economy due to the need for thermal management of the exhaust system to remove reductant deposits.

In order to reduce $NO_x$ emissions levels and improve aftertreatment system performance, improvements in aftertreatment designs that mitigate the adverse effects of low temperature exhaust conditions are needed. Accordingly, further technological developments in this area are desirable.

SUMMARY

Embodiments include unique systems and methods for managing an aftertreatment system using passive $NO_x$ adsorption and SCR catalyst elements. In certain embodiments, one or more devices for passive $NO_x$ adsorption also function for hydrocarbon (HC) and carbon monoxide (CO) conversion, NO oxidation, and HC adsorption, release and conversion. The systems and methods, by way of illustration and not limitation, enable $NO_x$ storage and management of $NO_x$ emissions under cold start and low temperature operating conditions where SCR catalyst elements have not reached an effective temperature range for $NO_x$ conversion, reduce or eliminate reductant deposition on the SCR catalyst elements that occurs due to reductant dosing in cold start and low temperature conditions, and improve $NO_x$ conversion efficiency of the SCR catalyst elements while in the effective temperature range by providing an$NO_2$/$NO_x$ ratios with an advantageous range in the feed gas to the SCR catalyst. The systems and methods provide for improved fuel economy by eliminating or reducing the need for thermal management strategies to increase exhaust temperatures that require additional fuel consumption, and by providing $NO_x$ adsorption upstream of the SCR catalyst that allows engine operations that produce higher engine-out $NO_x$ amounts during cold start conditions. The system and methods also improve the $NO_x$ conversion efficiency of the SCR catalyst and the ability to meet emissions requirements by providing $NO_x$ adsorption under cold start and low exhaust temperature conditions where the SCR catalyst is less effective.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
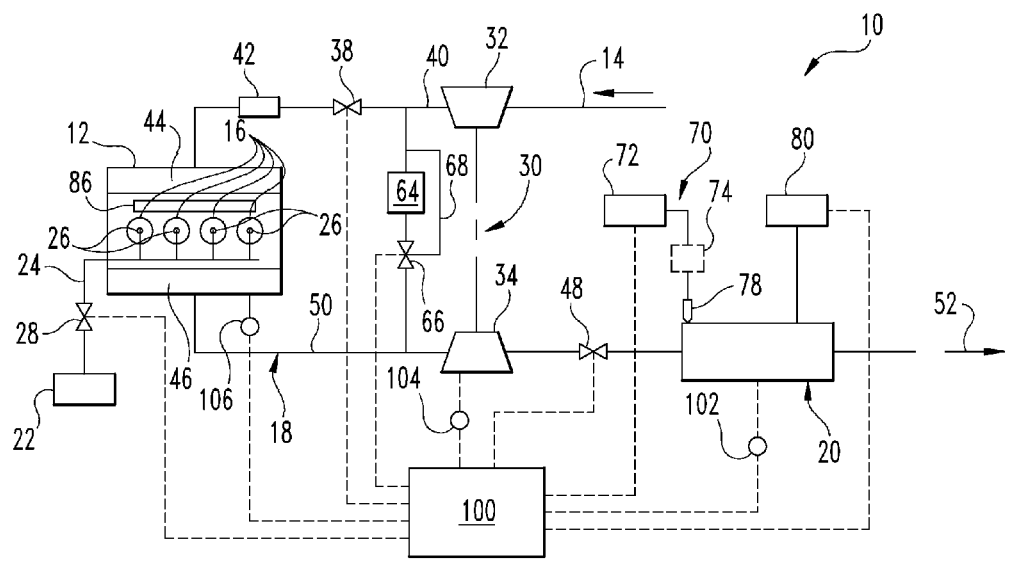
FIG. 1 is schematic of an exemplary internal combustion engine system for $NO_x$ reduction and aftertreatment system control using passive $NO_x$ adsorption.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

The systems and methods disclosed herein include various architectures for aftertreatment systems with passive $NO_x$ adsorption and SCR catalyst $NO_x$ reduction and procedures for controlling operations of such architectures. Passive $NO_x$ adsorption aftertreatment systems temporarily store $NO_x$ emissions produced by operation of an internal combustion engine during periods of low exhaust temperature operation, and then passively release the stored $NO_x$ emissions for aftertreatment when the exhaust temperature, passive $NO_x$ adsorption device (PNAD), and/or temperature of an SCR catalyst downstream of the $NO_x$ adsorption location increases to an effective temperature range. The systems and methods are configured so that at temperatures where $NO_x$ emissions are released, the SCR catalyst is effective at mitigating the released $NO_x$ emissions before exiting the tailpipe. In certain embodiments, devices for passive $NO_x$ adsorption also function for HC and CO conversion, HC storage and release, and NO oxidation to $NO_2$.

As shown in FIG. 1, an exemplary internal combustion engine system 10 includes an internal combustion engine 12 that receives fuel from at least one fuel source 22 and combusts the fuel with a charge flow from intake system 14 in a plurality of cylinders 16. The combusted charge flow/fuel mixture exits cylinders 16 as exhaust gas via an exhaust flow 52 into an exhaust system 18. Exhaust system 18 includes an aftertreatment system 20 with at least one of the architectures described herein for passive $NO_x$ adsorption during certain operating conditions, as discussed further below. In one embodiment, engine 12 is a diesel engine. Engine 12 is shown with four cylinders 16 that may be configured in an in-line arrangement as shown, but any suitable cylinder arrangement and number of cylinders are contemplated.

Engine 12 receives fuel from fuel source 22 via any suitable arrangement. For example, in the illustrated embodiment, fuel source 22 is connected to cylinders 16 with at least one fuel line 24 and a plurality of direct injectors 26. One or more direct injectors 26 may be associated with each cylinder 16 at any suitable injection location. In other embodiments, the fuel injectors include port injectors, or injection of fuel into intake system 14 upstream of cylinders 16. A fuel control valve 28 is shown schematically to control the amount, duration, and timing of fuel injection into cylinders 16, it being understood that fuel flow control can be provided directly by control of operation of each individual injector 26 or groups of injectors 26. In one embodiment, fuel injectors 26 are operated to provide a post-combustion injection of fuel that inserts unburned hydrocarbons into the exhaust gas flow for management and control of exhaust gas temperatures.

System 10 may further include a turbocharger 30 with a compressor 32 connected to an intake flowpath 40 of intake system 14. Compressor 32 is operationally connected to a turbine 34 connected to an exhaust flowpath 50 of exhaust system 18. Embodiments with no turbocharger are contemplated, as well as embodiments with multiple turbochargers in stages. In still other embodiments, multiple turbochargers are provided in parallel. Turbine 34 can include a single entry, a twin entry with separate entries for a divided exhaust manifold, a twin entry with an asymmetric configuration with or without a balancing valve therebetween, and/or one or more wastegates. Intake system 14 may further an intake throttle 38 downstream of compressor 32 and a charge air cooler 40 that is connected to intake manifold 44 via intake flowpath 40. Intake manifold 44 distributes the charge flow, which is compressed if compressor 32 is provided, to cylinders 16, either with or without fuel depending on the fuel injection system employed.

Exhaust system 18 includes an exhaust manifold 46 that receives an exhaust flow produced by combustion of the charge flow/fuel mixture in cylinders 16. The exhaust flow is provided to exhaust flowpath 50 for operation of turbine 34 if provided. Turbine 34 can be any type of turbocharger, including a variable geometry turbocharger with a controllable inlet, or a turbine with wastegate. Exhaust system 18 may further include an exhaust throttle 48, shown downstream of turbine 34 in the illustrated embodiment. Other embodiments contemplate exhaust throttle 48 is upstream of turbine 34, or that an exhaust throttle is omitted.

System 10 may further include an exhaust gas recirculation (EGR) system 60 that provides for recirculation of exhaust flow produced by all or a subset of cylinders 16. EGR system 60 includes an EGR conduit 62, an EGR cooler 64, and EGR control valve 66, and an EGR bypass 68 to bypass EGR cooler 64. EGR system 60 provides just one exemplary arrangement for an EGR system, and other arrangements are also contemplated. Systems 10 without an EGR system 60 are also contemplated.

Figure 2:
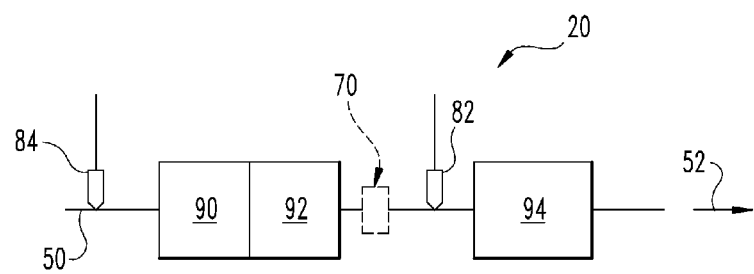
FIG. 2 is a schematic of one embodiment of a passive $NO_x$ adsorption aftertreatment system.

Aftertreatment system 20 receives exhaust flow 52 from engine 12 and provides passive storage of $NO_x$ that is produced by engine 12 in the exhaust flow 52 under certain operating conditions. Aftertreatment system 20 is connected to any one or more temperature generation devices 84 (FIG. 2), such as an exhaust heating apparatus 70 as shown in FIG. 1, that is operable to increase a temperature of the exhaust flow 52 to the $NO_x$ adsorption location. Temperature generation devices 84 provide one or more means for a controlled release of $NO_x$ from PNAD 90, or of heating the different catalyst elements in aftertreatment system 20. For example, exhaust heating apparatus 70 is located at a first location that is upstream of a passive $NO_x$ adsorption location of aftertreatment system 20. In some embodiments, as discussed further below, an exhaust heating apparatus 70 is omitted from system 10. Aftertreatment system 20 is also connected to a reductant source 80 at a second location that is downstream of the passive $NO_x$ adsorption location and upstream of at least the SCR catalyst. Reductant source 80 can include, for example, diesel exhaust fluid, urea, ammonia derived from urea, ammonia gas, a solid storage media that stores ammonia gas until heated above a threshold release temperature, or any suitable reductant and reductant delivery system. The reductant from reductant source 80 can be delivered to aftertreatment system 20 with a reductant injector 82 (FIG. 2.) Air assisted reductant delivery systems and systems without air assistance are contemplated.

System 10 includes a controller 100 that is operationally coupled to various sensors, actuators and components of system 10. The controller 100 may be in communication with any sensor, actuator, datalink, and/or network in the system 10. In FIG. 1, controller 100 is operably connected to one or more control valves 28 of the fuel system to control the timing, duration, and profile of fuel injection to cylinders 16 in accordance with fuelling maps, algorithms, or other instructions stored in controller 100. Controller 100 is also operably connected to intake throttle 38, exhaust throttle 48, EGR valve 66, and turbine 34 to control actuators associated therewith and regulate, for example, an exhaust temperature output from engine 12, an engine-out $NO_x$ amount, and other operating parameters.

Controller 100 is further operably connected to exhaust heating apparatus 70 to control heating of the exhaust flow 52 with exhaust heating apparatus 70, and is operably connected to reductant source 80 to control the timing and amount of reductant injection upstream of the SCR catalyst. As discussed further below, controller 100 is also connected to one or more sensors, either physical or virtual, such as sensors 102 associated with aftertreatment system 20, sensors 104 associated with exhaust system 18, and sensors 106 associated with engine 12 and intake system 14, to receive signals indicative of operating parameters thereof.

In one embodiment, the temperature generation device 84 includes exhaust heating apparatus 70. Exhaust heating apparatus 70 includes a source 72 of reductant such as $H_2$, small and long chain hydrocarbons (liquid or gaseous) that are provided to an optional thermal device 74, or hydrocarbons (liquid or gaseous) that are injected by a hydrocarbon doser or injector 78. Thermal device 74 can be any type of thermal generator or thermal enhancer, such as a catalytic burner, rich burner, or lean burner.

In addition to or in lieu of exhaust heating apparatus 70, other temperature generation devices 84 that provide heat to or facilitate the increase in heat of exhaust flow 52 upstream of the passive $NO_x$ adsorption location are contemplated. Temperature generation devices 84 include, for example, injectors 26 operated by controller 100 to provide the late post-combustion injection of fuel into the exhaust gas produced by the respective cylinder 16. Other temperature generation devices 84 include exhaust throttle 48 actuated by controller 100, intake throttle 38 actuated by controller 100, turbine 34 having a controllable inlet actuated by controller 100 to be positioned in a high exhaust backpressure position, a variable valve timing device 86 associated with cylinders 16 operable by controller 100 to vary the lift profile of the valves of cylinders 16 to control exhaust temperatures, and an operating state of engine 12 produced by controller 100 that produces increased exhaust gas temperatures.

Referring now to FIG. 2, one embodiment of aftertreatment system 20 is shown. Aftertreatment system 20 includes, in the direction of exhaust flow 52, a passive $NO_x$ adsorption device (PNAD) 90, a DPF 92 downstream of PNAD 90, and an SCR catalyst 94 having one or more SCR elements downstream of DPF 92. PNAD 90 is downstream of temperature generation device 84, and reductant injector 82 is between DPF 92 and SCR catalyst 94. In one embodiment PNAD 90 is a separate catalyst device that readily adsorbs and stores $NO_x$ on its surface under low exhaust temperature conditions, and then begins to desorb this $NO_x$ as the exhaust temperature and therefore the PNAD temperature increases.

In other embodiments, PNAD 90 in FIG. 2 is a passive $NO_x$ adsorption washcoat applied to a DOC substrate where the PNAD and DOC functionality are combined in a single device. The washcoat can be applied preferentially on an upstream side of the DOC substrate, preferentially on a downstream side of the DOC substrate, or uniformly on the DOC substrate. In still other embodiments, PNAD 90 includes a DOC washcoat and a passive $NO_x$ adsorption washcoat applied to a common substrate. Again the passive $NO_x$ adsorption washcoat can be applied preferentially upstream, preferentially downstream, or uniformly relative to the oxidation catalyst washcoat. In yet other embodiments of PNAD 90, the oxidation catalyst is applied as a washcoat to a passive $NO_x$ adsorption substrate. The oxidation catalyst washcoat can be applied preferentially upstream, preferentially downstream, or uniformly on the passive $NO_x$ adsorption substrate. In any arrangement, the PNAD 90 is configured to release the stored $NO_x$ at an exhaust flow temperature where the temperature of the SCR catalyst 94 is highly effective for reducing $NO_x$ to $N_2$ and $H_2O$.

Aftertreatment system 20 enables $NO_x$ storage on PNAD 90 at low exhaust temperatures when SCR catalyst 94 is not active and releases the stored $NO_x$ when SCR catalyst 94 is at a temperature effective for $NO_x$ conversion. In one embodiment, the effective or light-off temperature for efficient $NO_x$ conversion by SCR catalyst 94 is a temperature above about 200° C., although other effective or light-off temperature thresholds are contemplated depending on catalyst formulation, feed gas composition, and other parameters. As used herein a low temperature condition is a condition in which the temperature of SCR catalyst 94 is less than the effective temperature threshold of SCR catalyst 94. In one embodiment, the passive NOx adsorption washcoat includes a release temperature profile for releasing NOx and the SCR catalyst includes a light-off temperature, and a spacing between the passive NOx adsorption washcoat and the SCR catalyst is function of a difference between the light-off temperature and the release temperature profile. For example, if the release profile temperature is higher than the SCR catalyst light-off temperature, then the spacing can be increased more than if the release profile temperature is similar to the SCR light-off temperature. The spacing can further be a function of the in situ thermal response of any aftertreatment components between the PNAD 90 and SCR catalyst 94.

Figure 2A:
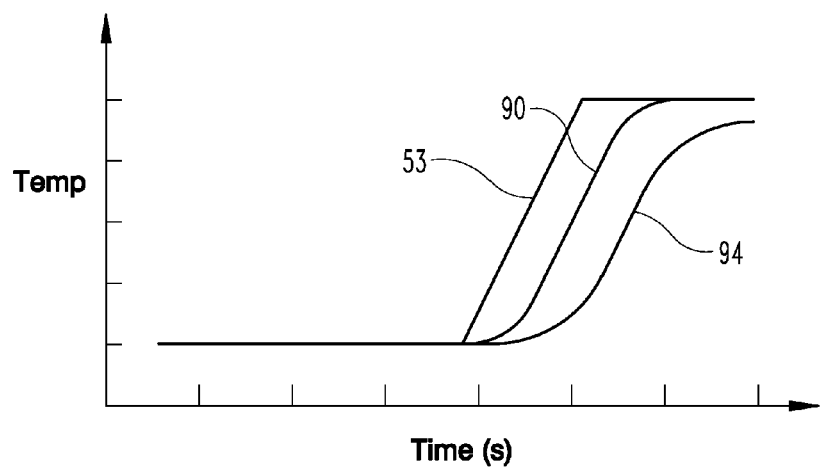
FIG. 2A is a graph of temperature profiles of the exhaust flow and components of the aftertreatment system over time.

In FIG. 2A there is shown a graph of a heating profile over time for a reference inlet exhaust flow 53, a PNAD 90, and an SCR catalyst 94 downstream of PNAD 90 spaced at a first axial position from the SCR catalyst such that the SCR catalyst 94 heats more slowly than PNAD 90. Assuming a light-off temperature of 200° C. for SCR catalyst 94, it can be observed that a release temperature profile for PNAD 90 in which $NO_x$ is released above 240° C. provides an arrangement where the $NO_x$ release is timed when the SCR catalyst 94 temperature is most efficient in reducing $NO_x$ at the spacing provided in FIG. 2A. If PNAD 90 and SCR catalyst 94 are spaced closer to one another, then the heating profiles over time will be more closely aligned with one another, and the difference between the release profile temperature and light-off temperature can be reduced. In addition, the release profile temperature/light-off temperature difference and/or resulting spacing between PNAD 90 and SCR catalyst 94 can be determined as a function of any additional thermal masses between PNAD 90 and SCR catalyst 94, such as other catalysts or particulate filters.

The release of $NO_x$ from PNAD 90 can be managed by controlling the heating of PNAD 90 with one or more of the temperature generation devices 84 to a $NO_x$ release temperature. The heating of exhaust flow 52 and PNAD 90 to the $NO_x$ release temperature can be actively managed, or can occur as a result of nominal operations of engine 12. The low temperature storage of $NO_x$ by PNAD 90 allows delay of injection of reductant from reductant injector 82 until higher operating temperatures are reached, avoiding the formation of reductant deposits. In addition, PNAD 90 may have an oxidation function, primarily for NO oxidation to $NO_2$ to provide an advantageous $NO_2/NO_x$ ratio in the feed gas composition to SCR catalyst 94 that improves $NO_x$ conversion efficiency. Also, in embodiments employing hydrocarbon injection with temperature generation device 84, the PNAD 90 with DOC functionality provides HC storage capabilities and provides reduced light-off temperatures for hydrocarbon oxidation than a diesel oxidation catalyst alone and a more rapid heating of the exhaust flow 52 and thus SCR catalyst 94 to its effective temperature threshold.

In still another embodiment, an exhaust heating apparatus 70 is provided downstream of PNAD 90 and upstream of SCR catalyst 94. Exhaust heating apparatus in this embodiment is operable to increase the exhaust temperature downstream of PNAD 90 to provide a more rapid warming of SCR catalyst 94 without increasing the temperature of PNAD 90. The ability to control the temperature of SCR catalyst 94 independently of the temperature of PNAD 90 facilitates the management of the timing of the $NO_x$ release from PNAD 90 and the reaching of the light-off temperature of SCR catalyst 94 where $NO_x$ conversion efficiency is above a desired threshold.

Figure 3:
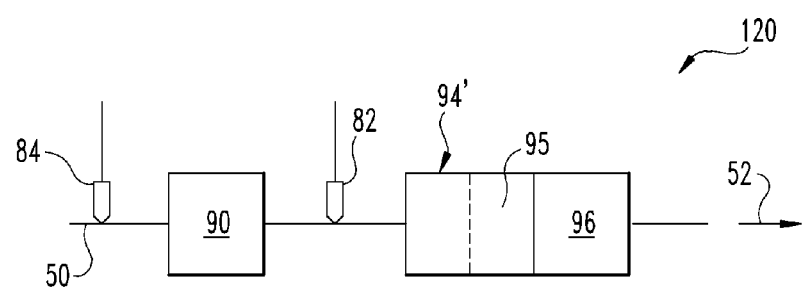
FIG. 3 is a schematic of another embodiment of a passive $NO_x$ adsorption aftertreatment system.

Referring to FIG. 3, another embodiment of aftertreatment system 20, designated as aftertreatment system 120, includes PNAD 90, either as a stand-alone device, or as a washcoat on a diesel oxidation catalyst substrate or with an oxidation catalyst washcoat. Aftertreatment system 120 does not include a DPF 92, but a modified SCR catalyst 94' includes a filter portion 95 applied thereto that is downstream of PNAD 90. An optional second SCR catalyst element 96 can be included downstream of modified SCR catalyst 94'.

Figure 4:
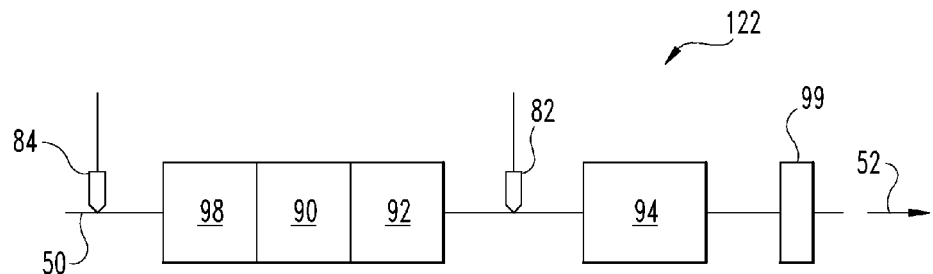
FIG. 4 is a schematic of another embodiment of a passive $NO_x$ adsorption aftertreatment system.

In FIG. 4 another embodiment of aftertreatment system 20, designated as aftertreatment system 122, includes, in order of the direction of exhaust flow 52, a diesel oxidation catalyst (DOC) 98, PNAD 90, DPF 92, reductant injector 82, and SCR catalyst 94. An optional ammonia oxidation (AMOX) catalyst 99 can be provided downstream of SCR catalyst 94, in this embodiment or any other embodiment of the aftertreatment system discussed herein. In certain embodiments, the AMOX 99 may not be present, or the AMOX may be commingled with the SCR catalyst 94 (or the last SCR catalyst, where multiple SCR catalyst elements are present), for example with a washcoat applied toward the rear portion of the SCR catalyst 94 that is responsive to at least partially oxidize ammonia. Further, certain components or all components the aftertreatment systems disclosed herein may be provided in the same or separate housings.

With respect to aftertreatment system 122, in addition to providing $NO_x$ storage at low temperature conditions and allowing reductant dosing to be delayed to higher temperatures to reduce reductant deposit formations, aftertreatment system 122 increases the effectiveness of thermal management of the aftertreatment system 122 by pre-oxidizing engine-out NO to $NO_2$ over the DOC 98. DOC 98 further provides an additional mechanism for thermal management of the PNAD 90 for the release of the stored $NO_x$ through, for example, oxidation of hydrocarbons upstream of PNAD 90.

Figure 5:
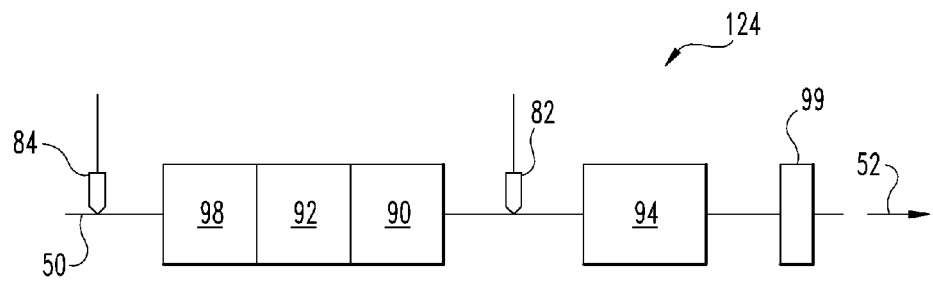
FIG. 5 is a schematic of another embodiment of a passive $NO_x$ adsorption aftertreatment system.

In FIG. 5 another embodiment of aftertreatment system 20, designated as aftertreatment system 124, includes, in order of the direction of exhaust flow 52, a DOC 98, DPF 92, PNAD 90, reductant injector 82, and SCR catalyst 94. An optional ammonia oxidation (AMOX) catalyst 99 can be provided downstream of SCR catalyst 94, or applied as a washcoat to SCR catalyst 94, to respond to ammonia slip conditions. While similar to aftertreatment system 122, the arrangement in aftertreatment system 124 increases the effectiveness in obtaining the $NO_x$ release temperature of PNAD 90 by pre-oxidizing engine-out NO to $NO_2$ over both the DOC 98 and DPF 92. The DOC 98 and DPF 92 provide additional mechanisms for thermal management of the PNAD 90 for the release of the stored $NO_x$ through, for example, operation of DPF 92 as a thermal mass upstream of PNAD 90. The DPF 92 also protects the PNAD from contaminants.

Figure 6:
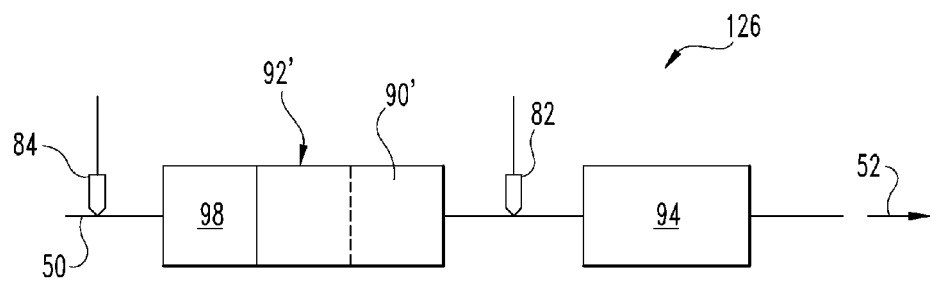
FIG. 6 is a schematic of another embodiment of a passive $NO_x$ adsorption aftertreatment system.

In FIG. 6 another embodiment of aftertreatment system 20, designated as aftertreatment system 126, includes, in order of the direction of exhaust flow 52, a DOC 98, a modified DPF 92' that includes a washcoat PNAD 90' applied to the downstream side of DPF 92', reductant injector 82, and SCR catalyst 94. The arrangement in aftertreatment system 126 provides for $NO_x$ storage at low temperature by washcoat PNAD 90'. In addition, at high temperature conditions the stored $NO_x$ by washcoat PNAD 90' effectively converts NO to $NO_2$ which enhances the passive regeneration of DPF 92'.

Figure 7:
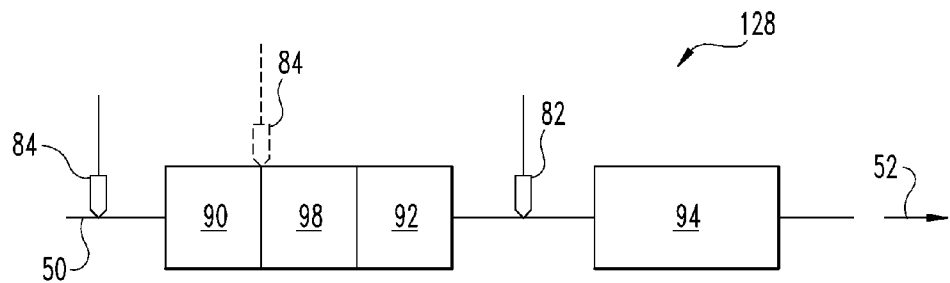
FIG. 7 is a schematic of another embodiment of a passive $NO_x$ adsorption aftertreatment system.

In FIG. 7 another embodiment of aftertreatment system 20, designated as aftertreatment system 128, includes, in order of the direction of exhaust flow 52, a PNAD 90, a DOC 98, DPF 92, PNAD 90, reductant injector 82, and SCR catalyst 94. In aftertreatment system 128, the aftertreatment components are arranged in ascending order of light-off temperature so that the lower light-off temperature component is located upstream the next component in the direction of exhaust flow 52. Due to higher catalyst loading, PNAD 90 lights-off for hydrocarbon oxidation at lower temperatures than DOC 98, and the hydrocarbon oxidation from PNAD 90 causes DOC 98 to obtain light-off more quickly for hydrocarbon oxidation, which increases the temperature of the exhaust flow 52 and SCR catalyst 94 more quickly. In a further embodiment, a temperature generation device 84 such as a hydrocarbon injector is provided downstream of PNAD 90 and upstream of DOC 98 for injection of hydrocarbons to light-off over DOC 98 and provide warm-up of SCR catalyst 94 more quickly than PNAD 90.

Figure 8:
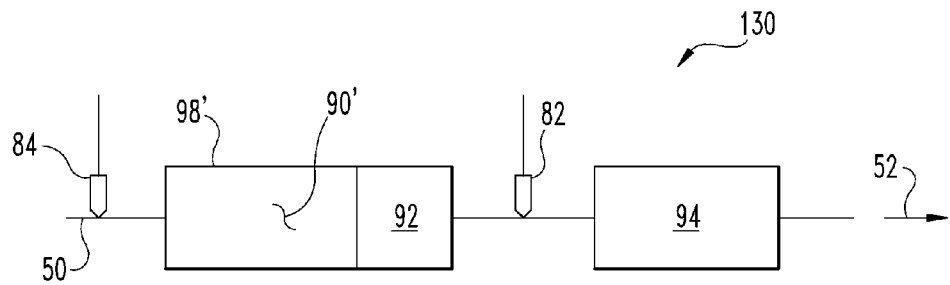
FIG. 8 is a schematic of another embodiment of a passive $NO_x$ adsorption aftertreatment system.

In FIG. 8 another embodiment of aftertreatment system 20, designated as aftertreatment system 130, includes, in order of the exhaust flow 52, a modified DOC 98' that includes a washcoat PNAD 90' applied thereto, a DPF 92, reductant injector 82, and SCR catalyst 94. Washcoat PNAD 90' can be applied uniformly to DOC 98', in an upstream portion only of DOC 98', or in a downstream portion only of DOC 98', to store $NO_x$ at low temperature conditions. In certain operation conditions, the ability to generate $NO_2$ in situ from the combined DOC 98' and washcoat PNAD 90' may assist PNAD washcoat 90' in storing additional $NO_x$. $NO_x$ release from washcoat PNAD 90' is accomplished more readily at the DOC light-off temperature due to the PNAD washcoat arrangement on DOC 98'. Furthermore, due to higher catalyst or precious metal loading, washcoat PNAD 90' lights-off for hydrocarbon oxidation at lower temperatures than DOC 98' which more rapidly increases the temperature of the exhaust flow 52 to the light-off temperature for DOC 98'.

Figure 9:
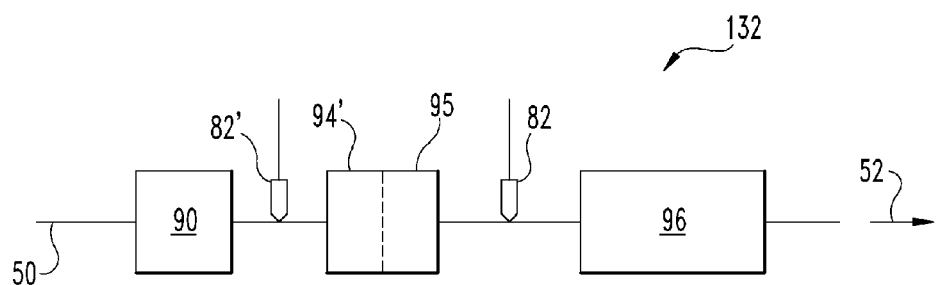
FIG. 9 is a schematic of another embodiment of a passive $NO_x$ adsorption aftertreatment system.

Referring to FIG. 9, another embodiment of aftertreatment system 20, designated as aftertreatment system 132 includes, in order of the direction of exhaust flow 52, PNAD 90, an upstream reductant injector 82', a modified SCR catalyst element 94' including a filter portion 95 applied thereto, downstream reductant injector 82, and second SCR catalyst element 96. Aftertreatment system 132 does not include temperature generation devices 84 such as exhaust heating apparatus 70, but does employ other temperature generation devices 84 from engine and actuator operations that increase exhaust gas temperatures. Upstream reductant injector 82' can be connected to the same source of reductant as reductant injector 82, or to a second source of reductant that contains, for example, diesel exhaust fluid, liquid urea, or gaseous ammonia stored in a solid storage medium.

In one embodiment, upstream reductant injector 82' is connected to a gaseous reductant source to provide ammonia gas that is more effective for $NO_x$ conversion at lower temperature conditions than liquid reductant. Downstream reductant injector is connected to a liquid reductant source which is more effective when SCR catalyst element 96 is above its effective temperature threshold. In another embodiment, upstream reductant injector 82' is connected to a liquid reductant source to provide liquid reductant to the SCR catalyst element 94' which reaches its effective temperature sooner that SCR catalyst element 96. Downstream reductant injector 82 is connected to a gaseous reductant source which may allow a lower effective temperature threshold for SCR catalyst element 96. Other embodiments contemplate both reductant injectors are connected to either a gaseous reductant source or a liquid reductant source.

In one embodiment, SCR catalyst element 94' is smaller than downstream SCR catalyst element 96 and reaches an effective temperature range more quickly than SCR catalyst element 96, allowing reductant injection from upstream reductant injector 82' to provide $deNO_x$ capabilities for SCR catalyst element 94' of $NO_x$ released from PNAD 90 before SCR catalyst element 96. In addition, filter portion 95 can be configured to provide storage of $NO_x$ that might be released from PNAD 90 before SCR catalyst element 96 is above its effective temperature threshold if SCR catalyst element 94' has not reached its effective temperature threshold. In one embodiment, PNAD 90 provides a first $NO_x$ storage means for adsorbing $NO_x$ from the exhaust gas up to a first temperature value. SCR catalyst element 94' provides a second NO storage means such as filter portion 95 with a $NO_x$ adsorption washcoat for adsorbing $NO_x$ from the exhaust gas up to a second temperature value. SCR catalyst element 96 provides a $NO_x$ reduction means for converting $NO_x$ to N2 above an effective reduction temperature threshold. In a particular embodiment, the reductant temperature threshold and the second temperature value are each less than the first temperature value to ensure the SCR catalyst elements receive $NO_x$ only when in a highly efficient $NO_x$ reduction operating condition.

In addition, SCR catalyst element 96 provides an in situ thermal response that is greater than the in situ thermal response of SCR catalyst element 94'. The in situ thermal response, in one embodiment, is the thermal mass in combination with the dynamic heat transfer of the component under consideration. In FIG. 9, SCR catalyst element 94' develops capability to convert $NO_x$ before SCR catalyst element 96 and therefore has an in situ thermal response that is less than that of SCR catalyst element 96. In the discussions that follow, reference to an SCR catalyst 94 also includes modified SCR catalyst 94' and SCR catalyst element 96 unless noted otherwise. Also, reference to DOC 98 includes modified DOC 98' and reference to DPF 92 includes modified DPF 92' unless noted otherwise.

The aftertreatment system embodiments disclosed herein can be controlled to reduce $NO_x$ emissions, improve fuel economy, and other benefits discussed herein by operation of controller 100. In the discussions that follow, the aftertreatment systems are designated generally as aftertreatment system 20, but all aftertreatment system embodiments 20, 120, 122, 124, 126, 128, 130, and 132 are contemplated in the discussion when applicable. Controller 100 can include a number of modules structured to functionally execute operations for controlling the system 10. In certain embodiments, the controller 100 forms a portion of a processing subsystem including one or more computing devices having memory, processing, and communication hardware. The controller 100 may be a single device or a distributed device, and the functions of the controller may be performed by hardware or software. The controller 100 may be in communication with any sensor, actuator, datalink, and/or network in the system.

In certain embodiments, the controller 100 includes a $NO_x$ characteristic determination module that determines a $NO_x$ storage characteristic of PNAD 90. Controller 100 may also include a temperature determination module that determines the temperature of SCR catalyst 94 so that $NO_x$ release from PNAD is conducted while SCR catalyst 94 is at an effective $NO_x$ reduction temperature, and $NO_x$ is stored by PNAD 90 when SCR catalyst 94 is below an effective $NO_x$ reduction temperature threshold. The temperature determination module may also determine temperature conditions of one or more other components, such as PNAD 90, DPF 92, and DOC 98, for thermal management of one or more of these components in response to, for example, regeneration conditions being present, contaminant and/or particulate accumulation conditions exceeding a threshold amount, or other thermal management event initiation conditions being satisfied.

Controller 100 may also include a temperature generation device control module to control operation of one or more the temperature generation devices 84 to produce the desired exhaust flow temperatures in response to, for example, a target temperature of the exhaust flow, and/or a target temperature of one or more of PNAD 90, DPF 92, SCR catalyst 94, and DOC 98. Controller 100 may further include a dosing control module to control reductant dosing from one or both of reductant injectors 82, 82' to provide a reductant amount for $NO_x$ reduction according to any suitable reductant amount determination technique.

The description herein including modules emphasizes the structural independence of the aspects of the controller 100, and illustrates one grouping of operations and responsibilities of the controller 100. Other groupings that execute similar overall operations are understood within the scope of the present application. Modules may be implemented in hardware and/or software on computer readable medium, and modules may be distributed across various hardware or software components.

The exemplary system 10 further includes various sensors 102 associated with the aftertreatment system 20, such as $NO_x$ sensors to determine engine-out $NO_x$ amounts, PNAD out $NO_x$ amounts, and tailpipe $NO_x$ amounts, and temperature sensors to determine the temperature of the exhaust flow or a component at one or more locations along the exhaust and aftertreatment system. Other sensors can be provided to measure or determine the mass flow through the exhaust system, the amount of ammonia stored in SCR catalyst 94 or outlet therefrom, an $NO_2$ or $NO_x$ amount at one or more locations along aftertreatment system 20, a pressure condition, etc.

Sensors 104 can be provided to measure or determine the mass flow through the exhaust system 18, a temperature or operating parameter associated with turbine 34, other exhaust system condition. Sensors 106 can be provided to measure or determine an engine speed, engine load, intake manifold pressure and/or temperature, exhaust manifold temperature and/or pressure, a charge flow in intake system 14, and any other suitable engine operating condition parameter.

The illustrated sensors are exemplary only, and may be re-positioned, removed, substituted, and other sensors may be present that are not illustrated in FIG. 1. Further, while physical sensors are contemplated for certain sensors, other sensors may instead be virtual sensors that are calculated from other parameters available to the system 10, or values that would be indicated by sensors may instead be supplied to a computer readable memory location, via a datalink or network communication, or otherwise be made available to the system 10 where the sensor providing the sensed parameter is not a part of the defined system 10.

For example, one or more sensors associated with PNAD 90 can be used to provide signals indicative of a $NO_x$ storage characteristic of PNAD 90. Example sensors include, for example, an engine-out $NO_x$ sensor (physical or virtual) operable to provide signals indicative of an engine-out $NO_x$ amount to controller 100. A second $NO_x$ sensor could be provided downstream of PNAD 90 to provide an indication and timing of a $NO_x$ amount released from PNAD 90. In another example, a temperature sensor is operable to provide a signal of a temperature condition of PNAD 90 to controller 100, which could also be correlated to the timing and amount of $NO_x$ released to determine a $NO_x$ storage characteristic. Information from these sensors can be used to determine a current $NO_x$ storage characteristic of PNAD 90 that is between 0% of designed storage characteristic (i.e. PNAD 90 is full) and 100% of designed storage characteristic (i.e. PNAD 90 is empty.) For example, if the current storage characteristic of PNAD is zero or at a threshold amount indicating a nearly full PNAD 90, then certain operations can be initiated by controller 100 in response to this condition. If a current $NO_x$ storage characteristic of 100% available, or at some percentage greater than 0% indicating a partial storage characteristic availability for $NO_x$ that is produced, then controller 100 can initiate certain other operations in response to this condition.

A determination of the $NO_x$ storage characteristic of PNAD 90 can be used to improve fuel economy by modulating the engine-out $NO_x$ to, for example, make use of an available $NO_x$ storage characteristic by increasing engine-out $NO_x$. Emissions improvements can be obtained by reducing engine-out $NO_x$ when there is little or no $NO_x$ storage characteristic on PNAD 90.

Figure 10:
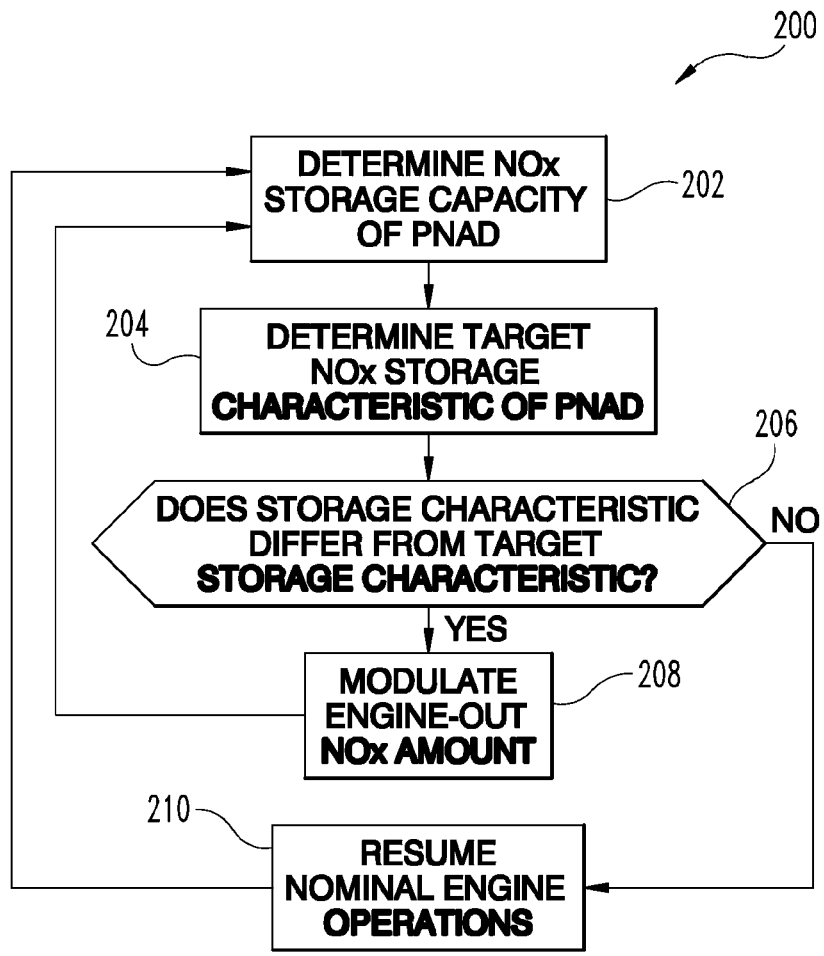
FIG. 10 is a flow diagram of one embodiment of a procedure for managing a passive $NO_x$ adsorption aftertreatment system.

One embodiment of a procedure is discussed with reference to FIG. 10. In FIG. 10 a procedure 200 includes an operation 202 to determine a current $NO_x$ storage characteristic of PNAD 90, as discussed above. Procedure 200 further includes an operation 204 to determine a target storage characteristic of PNAD 90. The target storage characteristic can vary depending on the operating conditions of the aftertreatment system 20. For example, if SCR catalyst 94 is not in an effective $NO_x$ reduction temperature range, then the target $NO_x$ storage characteristic could be determined to be 0% so that the maximum amount of $NO_x$ is stored by PNAD 90 during such conditions. If SCR catalyst 94 is in an effective reduction temperature range, then the target $NO_x$ storage characteristic could be determined to be 100% or some other high amount so that stored $NO_x$ is released from PNAD 90 for treatment by SCR catalyst 94.

Procedure 200 continues at conditional 206 to determine if the $NO_x$ storage characteristic differs from the target $NO_x$ characteristic by more than a threshold amount. If conditional 206 is NO, procedure 200 continues at operation 210 to resume or maintain nominal engine operations. If conditional 206 is YES, procedure 200 continues at operation 208 to modulate the engine-out $NO_x$ amount so the current $NO_x$ storage characteristic of PNAD 90 is adjusted toward the target $NO_x$ storage characteristic by the flux in $NO_x$ amounts to PNAD 90. In another embodiment, operation 208 can include modulating the exhaust temperature by operating one or more of the temperature generation devices 84 so the current $NO_x$ storage characteristic is adjusted toward the target $NO_x$ storage characteristic. When the current $NO_x$ storage characteristic determined at operation 202 is aligned with the target storage $NO_x$ characteristic, procedure 200 can end or continue at operation 204 to identify a new target $NO_x$ storage characteristic for PNAD 90.

Figure 11:
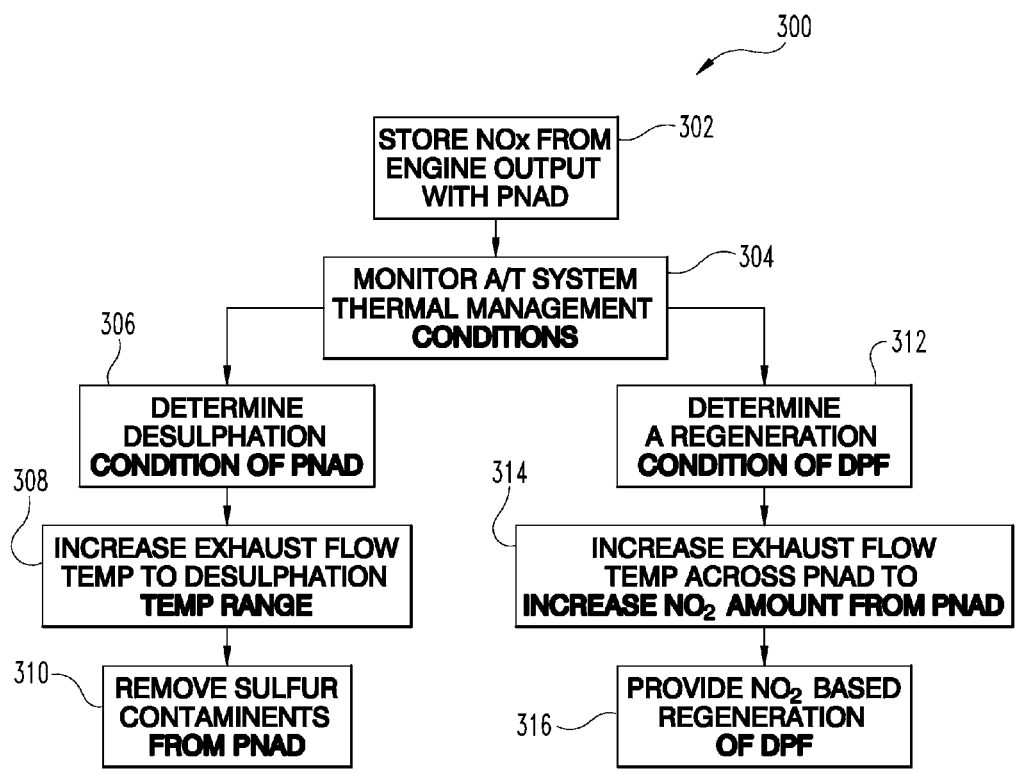
FIG. 11 is a flow diagram of another embodiment procedure for managing a passive $NO_x$ adsorption aftertreatment system.

Another embodiment procedure is discussed with reference to FIG. 11. In FIG. 11 a procedure 300 includes an operation 302 to store $NO_x$ output from engine 12 with PNAD 90. Procedure 300 further includes an operation 304 to monitor aftertreatment system 20 for thermal management conditions. A thermal management condition can include any condition, such as HC desorption, reductant deposit removal, contamination, chemical poisoning, particulate accumulation, or sulphur accumulation, on one or more components of aftertreatment system 20. For example, operation 306 includes determining a desulphation condition of PNAD 90 due to sulphur accumulation on PNAD 90 exceeding a threshold amount. A desulphation condition can be determined by any suitable method or measurement to provide an indication of a sulphur amount stored on PNAD 90 exceeding a threshold amount. Procedure 300 includes an operation 308 to increase the temperature of the exhaust flow to a desulphation temperature range by operation of one or more of the temperature generation devices 84. Procedure 300 also includes an operation 310 to remove, at least partially, the sulphur contaminants from PNAD 90 by operating the exhaust flow in the desulphation temperature range, such as between 300-700° C., for a period of time ranging from 5 minutes to 3 hours.

In another embodiment, procedure 300 includes an operation 312 to determine a regeneration condition of DPF 92 in response to, for example, an indication of particulate matter accumulation on DPF 92 exceeding a threshold amount. In response to the regeneration condition, procedure 300 includes an operation 314 to increase the temperature of the exhaust flow across PNAD 90 to increase $NO_2$ make from PNAD 90. At operation 316 the $NO_2$ make from PNAD 90 provides an $NO_2$ based regeneration of DPF 92 with exhaust temperatures around 250° C. or greater. In another embodiment, an $O_2$ based regeneration of DPF 92 can be provided by dosing hydrocarbons across PNAD 90.

Figure 12:
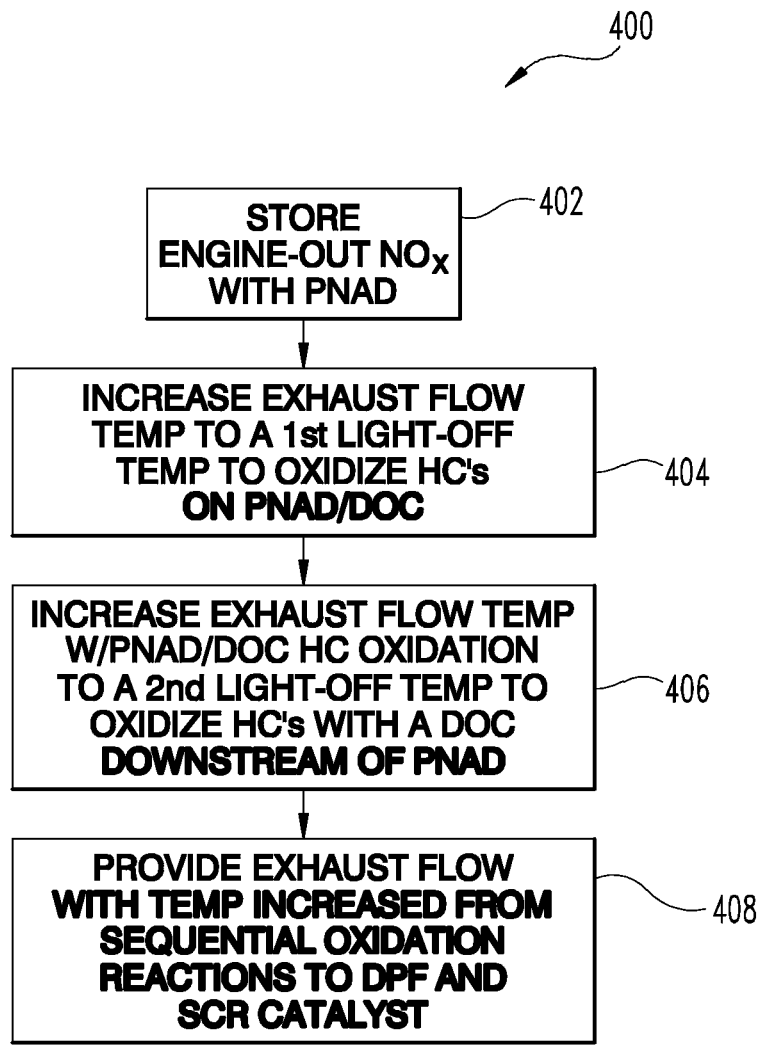
FIG. 12 is a flow diagram of another embodiment procedure for managing a passive $NO_x$ adsorption aftertreatment system.

Referring now to FIG. 12, another embodiment procedure 400 is shown that has application with, for example, the aftertreatment system 128 embodiment in FIG. 7. Procedure 400 includes an operation 402 to store $NO_x$ output from engine 12 with PNAD 90, which is located upstream of a DOC 98, and the DOC 98 is located upstream of the DPF 92. Procedure 400 includes an operation 404 to increase the exhaust flow temperature to a first light-off temperature that oxidizes hydrocarbons across for example, a PNAD 90 with DOC functionality. The increase in the exhaust temperature can be provided by one or more of the temperature generation devices 84. When the first light-off temperature is obtained, hydrocarbon dosing can be provided, for example, with an exhaust heating apparatus 70 including a hydrocarbon source and hydrocarbon injector, or by a temperature generation device 84 including post-combustion injection of hydrocarbons into cylinders 16 with injectors 26.

Procedure 400 continues at operation 406 by increasing the exhaust flow temperature through hydrocarbon oxidation across DOC 98 at a second light-off temperature for DOC 98, which is greater than the first light-off temperature. The second light-off temperature for DOC 98 provides oxidation of the injected hydrocarbons across DOC 98 so that at operation 408 the exhaust flow 52 is provided with a temperature increased from sequential oxidation reactions on PNAD 90 and DOC 98, providing a more rapid heating of the exhaust flow to obtain effective operating temperatures for operation of DPF 92 and SCR catalyst 94.

In another embodiment procedure, aftertreatment systems employing a DOC 98 upstream of PNAD 90, or combined in a singled device as a washcoat upstream of a PNAD 90, can employ hydrocarbon dosing across DOC 98 or the DOC washcoat to manage exhaust flow temperatures to release $NO_x$ from PNAD 90 when, for example, there is no or little available $NO_x$ storage characteristic. For aftertreatment systems with a DOC 98 or DOC washcoat, $NO_2$ make from the DOC 98 or DOC washcoat can be modulated by operation of temperature generation devices 84 or by engine-out $NO_x$ modulation to increase or decrease the storage characteristic of PNAD 90. One or more of the temperature generation devices 84 can also be used to modulate the exhaust flow temperatures across PNAD 90 to modulate the $NO_2$ make by PNAD 90 for $NO_2$ based regeneration of DPF 92, or to modulate the $NO_x$ storage characteristic of PNAD 90 toward a target $NO_x$ storage characteristic.

In another embodiment procedure, an $NO_2/NO_x$ amount to an inlet of the SCR catalyst 94 is interpreted and the exhaust heating apparatus 70 is controlled to modulate a temperature of the exhaust gas to the PNAD 90 in response to a deviation of the $NO_2/NO_x$ amount from a target $NO_2/NO_x$ amount. In a further embodiment, a temperature condition of the DPF 92 is interpreted and the exhaust heating apparatus 70 is controlled to modulate a temperature of the exhaust gas to the PNAD 90 in response to a deviation of the temperature condition of the DPF 92 from a target temperature condition.

The descriptions here provide illustrative embodiments of performing procedures for controlling an aftertreatment system with PNAD 90. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

As is evident from the figures and text presented above, a variety of embodiments according to the present disclosure are contemplated.

According to one aspect, an aftertreatment system includes a plurality of aftertreatment components in an exhaust flowpath. The plurality of aftertreatment components include a passive $NO_x$ adsorption device, a diesel particulate filter downstream of the passive $NO_x$ adsorption device, and a SCR catalyst downstream of the diesel particulate filter. The system also includes a reductant injector operationally coupled to a reductant source that is operable to provide a reductant from the reductant source into the exhaust flowpath upstream of the SCR catalyst, such as between the diesel particulate filter and the SCR catalyst. The system also includes at least one of a first exhaust heating apparatus upstream of the passive $NO_x$ adsorption device that is configured to increase a temperature of an exhaust gas in the exhaust flowpath upstream of the passive $NO_x$ adsorption device and a second exhaust heating apparatus downstream of the passive NOx adsorption device that is configured to increase the temperature of the exhaust gas in the exhaust flowpath upstream of the SCR catalyst.

In one embodiment, the at least one exhaust heating apparatus is configured to increase the temperature of the exhaust gas upstream of the passive $NO_x$ adsorption device without oxidizing hydrocarbons upstream of the passive $NO_x$ adsorption device. In another embodiment, the at least one exhaust heating apparatus includes a hydrocarbon injector connected to a hydrocarbon source and to the exhaust flowpath.

In another embodiment, the at least one exhaust heating apparatus includes a second reductant injector connected to a second reductant source and the exhaust flow path. In a refinement of this embodiment, the second reductant source includes at least one of $H_2$, CO and hydrocarbons.

In another embodiment, the at least one exhaust heating apparatus includes a thermal enhancer connected to a hydrocarbon source. In yet another embodiment, the at least one exhaust heating apparatus includes a fuel injector connected to a fuel source and to at least one of an engine cylinder and a thermal generator. In another embodiment, the reductant includes at least one of diesel exhaust fluid, urea, and ammonia gas releasably stored on a solid storage media.

According to another aspect, an aftertreatment system includes a plurality of aftertreatment components in an exhaust flowpath. The plurality of aftertreatment components include a diesel oxidation catalyst with a passive $NO_x$ adsorption washcoat configured to store $NO_x$, a diesel particulate filter downstream of the diesel oxidation catalyst, and a SCR catalyst downstream of the diesel particulate filter. The system includes at least one reductant source for storing a reductant and a reductant injector connected to the at least one reductant source operable to provide the reductant into the exhaust flowpath upstream of the SCR catalyst. The passive NOx adsorption washcoat includes a release temperature profile for releasing NOx and the SCR catalyst includes a light-off temperature, and a spacing between the passive NOx adsorption washcoat and the SCR catalyst is sized as a function of a difference between the light-off temperature and the release temperature profile.

In one embodiment, the system also includes at least one exhaust heating apparatus upstream of the diesel oxidation catalyst that is configured to increase a temperature of an exhaust gas in the exhaust flowpath upstream of the diesel oxidation catalyst in response to a $NO_x$ storage characteristic of the passive $NO_x$ adsorption washcoat.

In one embodiment, the passive $NO_x$ adsorption washcoat is applied uniformly on the diesel oxidation catalyst. In another embodiment, the passive $NO_x$ adsorption washcoat is applied only on a downstream portion of the diesel oxidation catalyst. In yet another embodiment, the passive $NO_x$ adsorption washcoat is applied only on an upstream portion of the diesel oxidation catalyst.

According to another aspect, an aftertreatment system includes a plurality of aftertreatment components in an exhaust flowpath. The plurality of aftertreatment components include a passive $NO_x$ adsorption device, a particulate filter including a first SCR portion, the particulate filter with the SCR portion being downstream of the passive $NO_x$ adsorption device, and a SCR catalyst element downstream of the particulate filter with the SCR portion. The system includes at least one reductant source for storing at least one reductant and a first reductant injector operable to provide a reductant into the exhaust flowpath upstream of the particulate filter with the SCR portion.

In one embodiment, the system also includes a SCR catalyst element downstream of the passive $NO_x$ adsorption device. In another embodiment, a second reductant injector operable to provide the reductant into the exhaust flow path between the particulate filter with the SCR portion and the SCR element.

In one embodiment, the at least one reductant comprises liquid urea. In another embodiment, the at least one reductant includes a gaseous reductant connected to the first reductant injector and a liquid reductant connected to the second reductant injector. In yet another embodiment, the at least one reductant includes a liquid reductant connected to the first reductant injector and a gaseous reductant connected to the second reductant injector. In yet another embodiment, the at least one reductant includes a gaseous reductant connected to the first reductant injector and to the second reductant injector.

According to another aspect, a system includes an internal system combustion engine including a plurality of cylinders operable to produce an exhaust flow into an exhaust system and an aftertreatment system for receiving the exhaust flow. The aftertreatment system includes, in the direction of the exhaust flow, an exhaust heating apparatus, a passive $NO_x$ adsorption device, a reductant injector connected to a reductant source, and a SCR catalyst. The system also includes at least one sensor associated with the aftertreatment system operable to provide a signal. The system further includes a controller structured to determine a $NO_x$ storage characteristic of the passive $NO_x$ adsorption device in response to the signal and to control the engine to modulate the engine operation, such as an engine-out $NO_x$ amount, in response to the $NO_x$ storage characteristic of the passive $NO_x$ adsorption device.

In one embodiment, the at least one sensor includes a first sensor operable to provide a signal indicative of a temperature associated with the passive $NO_x$ adsorption device and a second sensor operable to provide a signal indicative of a $NO_x$ amount.

In one embodiment, the controller is structured to interpret an $NO_2/NO_x$ amount to an inlet of the SCR catalyst and control the exhaust heating apparatus to modulate a temperature of the exhaust gas to the passive $NO_x$ adsorption device in response to a deviation of the $NO_2/NO_x$ amount from a target $NO_2/NO_x$ amount. In another embodiment, the aftertreatment system includes a particulate filter between the passive $NO_x$ adsorption device and the reductant injector, and the controller is structured to determine a temperature condition of the particulate filter and control the exhaust heating apparatus to modulate a temperature of the exhaust gas to the passive $NO_x$ adsorption device in response to a deviation of the temperature condition of the particulate filter from a target temperature condition.

In another embodiment, the passive $NO_x$ adsorption device includes an oxidation catalyst portion. In a refinement of this embodiment, the oxidation catalyst portion is applied as a washcoat to the passive $NO_x$ adsorption device. In another refinement, the exhaust heating apparatus includes a hydrocarbon injector connected to a hydrocarbon source and to the aftertreatment system at an injection location for injection of hydrocarbons for oxidation across the oxidation catalyst portion of the passive $NO_x$ adsorption device. In a further refinement, in response to a deviation of the $NO_x$ storage characteristic of the passive $NO_x$ adsorption device from a target storage characteristic, the controller is structured to modulate $NO_2$ production on the passive $NO_x$ adsorption device. In yet another refinement, in response to a degradation condition, such as sulphur accumulation, on the passive $NO_x$ adsorption device exceeding a threshold amount, the controller is structured to control the hydrocarbon injector to inject a hydrocarbon amount for oxidation across the oxidation catalyst portion that increases a temperature of the passive $NO_x$ adsorption device to a degradation reversal temperature range.

In another refinement of the above embodiment, the aftertreatment system includes a particulate filter between the passive $NO_x$ adsorption device and the reductant injector, and the controller is configured to determine a regeneration condition of the particulate filter and control the exhaust heating apparatus to heat the exhaust gas and modulate an $NO_2$ amount released by the passive $NO_x$ adsorption device for an $NO_2$ based regeneration of the particulate filter. In another refinement, the exhaust heating apparatus includes a fuel injection system configured to provide a post-combustion injection of hydrocarbons into the at least one cylinder for oxidation across the oxidation catalyst portion of the passive $NO_x$ adsorption device. In yet another refinement, in response to a deviation of the $NO_x$ storage characteristic of the passive $NO_x$ adsorption device from a target $NO_x$ storage characteristic, the controller is configured to control the exhaust heating apparatus to adjust the exhaust gas temperature and modulate an $NO_2$ amount produced by the oxidation catalyst portion thereby modulating the $NO_x$ storage characteristic toward the target $NO_x$ storage characteristic. In another embodiment, the controller is configured to control the exhaust heating apparatus to heat the exhaust gas and modulate an $O_2$ amount released by the passive $NO_x$ adsorption device for an $O_2$ based regeneration of the particulate filter.

In another embodiment, the SCR catalyst includes a filter portion. In a refinement of this embodiment, the aftertreatment system includes an SCR catalyst element downstream of the SCR catalyst with the filter portion.

In another embodiment, the aftertreatment system includes an oxidation catalyst between the exhaust heating apparatus and the passive $NO_x$ adsorption device and a particulate filter between the passive $NO_x$ adsorption device and the reductant injector. In yet another embodiment, the aftertreatment system includes an oxidation catalyst and a particulate filter between the exhaust heating apparatus and the passive $NO_x$ adsorption device. In a refinement of this embodiment, the particulate filter is between the oxidation catalyst and the passive $NO_x$ adsorption device.

In another embodiment, the aftertreatment system includes an oxidation catalyst between the exhaust heating apparatus and the passive $NO_x$ adsorption device and a particulate filter downstream of the oxidation catalyst, wherein the passive $NO_x$ adsorption device is a coating on the particulate filter. In yet another embodiment, the aftertreatment system includes an oxidation catalyst and a particulate filter between the passive $NO_x$ adsorption device and the reductant injector. In a refinement of this embodiment, the oxidation catalyst is between the passive $NO_x$ adsorption device and the particulate filter.

In another embodiment, the aftertreatment system includes an oxidation catalyst downstream of the exhaust heating apparatus, the passive $NO_x$ adsorption device is a washcoat on the oxidation catalyst, and the aftertreatment system further includes a particulate filter downstream of the oxidation catalyst and upstream of the reductant injector. In yet another embodiment, the exhaust heating apparatus is selected from the group consisting of: a fuel injector connected to at least one of the plurality of cylinders and a fuel source; a hydrocarbon injector connected to the exhaust system and a hydrocarbon source; a thermal generator; a second reductant injector connected to a second reductant source; and a thermal enhancer connected to a hydrocarbon source.

According to another aspect, a system includes an internal system combustion engine including a plurality of cylinders operable to produce an exhaust flow into an exhaust system, and an aftertreatment system for receiving the exhaust flow. The aftertreatment system includes, in the direction of the exhaust flow, a heating apparatus, a passive $NO_x$ adsorption device including an oxidation catalyst portion, a reductant injector connected to a reductant source, and a SCR catalyst. The system also includes a plurality of sensors associated with the aftertreatment system, the plurality of sensors including at least one sensor operable to provide a signal indicative of a $NO_x$ storage characteristic of the passive $NO_x$ adsorption device. The system also includes a controller structured to interpret the $NO_x$ storage characteristic of the passive $NO_x$ adsorption device and a target storage characteristic of the passive $NO_x$ adsorption device. The controller is further structured to control the heating apparatus to adjust the $NO_x$ storage characteristic toward the target storage characteristic.

In one embodiment, the exhaust heating apparatus includes a hydrocarbon injector connected to a hydrocarbon source and the controller is further structured to determine a hydrocarbon amount for dosing of hydrocarbons to the oxidation catalyst to adjust the $NO_x$ storage characteristic toward the target storage characteristic and control the hydrocarbon injector to provide the hydrocarbon amount.

In another embodiment, the aftertreatment system includes a particulate filter between the passive $NO_x$ adsorption device and the reductant injector, and the controller is structured to determine a regeneration condition of the particulate filter and provide a hydrocarbon amount for dosing of hydrocarbons to the oxidation catalyst to increase a temperature of the exhaust flow to the particulate filter to a particulate filter regeneration temperature range.

In another embodiment, the oxidation catalyst portion is applied as a washcoat to the passive $NO_x$ adsorption device. In yet another embodiment, the hydrocarbon injector includes at least one fuel injector connected to at least one of the plurality of cylinders of the internal combustion engine and the fuel injector is operable to provide at least a portion of the hydrocarbon amount via a post-combustion injection of fuel into the at least one cylinder. In a further embodiment, the hydrocarbon injector is connected to the exhaust system downstream of the plurality of cylinders.

In another embodiment, in response to a sulphur contaminant accumulation on the passive $NO_x$ adsorption device exceeding a threshold amount, the controller is configured to control the hydrocarbon injector to inject a hydrocarbon amount for oxidation across the oxidation catalyst portion to increase a temperature of the passive $NO_x$ adsorption device to a desulphation temperature range. In yet another embodiment, in response to a deviation of the $NO_x$ storage characteristic of the passive $NO_x$ adsorption device from a target $NO_x$ storage characteristic, the controller is configured to provide a hydrocarbon amount for dosing of hydrocarbons to the oxidation catalyst to adjust the exhaust gas temperature and modulate an $NO_2$ amount produced by the oxidation catalyst portion to modulate the $NO_x$ storage characteristic toward the target $NO_x$ storage characteristic.

In one embodiment, the plurality of sensors include at least one sensor operable to provide a signal indicative of a temperature of the SCR catalyst and at least one sensor operable to provide a signal indicative of an engine-out $NO_x$ amount. The controller is structured to determine the target storage characteristic of the passive $NO_x$ adsorption device in response to the temperature of the SCR catalyst and the engine-out $NO_x$ amount. In a refinement of this embodiment, the controller is configured to control the engine to modulate the engine-out $NO_x$ amount in response to the $NO_x$ storage characteristic of the passive $NO_x$ adsorption device.

In another embodiment, the SCR catalyst includes a filter portion. In a refinement of this embodiment, the aftertreatment system includes an SCR catalyst element downstream of the SCR catalyst with the filter portion.

In another embodiment, the oxidation catalyst includes a substrate and the passive $NO_x$ adsorption device includes a washcoat applied to the substrate. In one refinement, the washcoat for the passive $NO_x$ adsorption device is applied uniformly on the entire substrate of the oxidation catalyst. In another refinement, the washcoat for the passive $NO_x$ adsorption device is applied preferentially on a downstream portion of the substrate of the oxidation catalyst. In yet another refinement, the washcoat for the passive $NO_x$ adsorption device is applied preferentially on an upstream portion of the substrate of the oxidation catalyst.

According to another aspect, a method includes: storing in an exhaust flowpath, upstream of a selective catalytic reduction (SCR) catalyst, $NO_x$ emissions in an exhaust flow from an internal combustion engine during low exhaust temperature operation with a passive NOx adsorption device; determining a NOx storage characteristic of the passive NOx adsorption device; and modulating a $NO_x$ output of the internal combustion engine in response to the $NO_x$ storage characteristic. Modulating the $NO_x$ output includes increasing the $NO_x$ output in response to the $NO_x$ storage characteristic being greater than a first threshold and reducing the $NO_x$ output in response to the $NO_x$ storage characteristic being less than a second threshold.

In one embodiment, the method includes determining a target storage characteristic of the passive $NO_x$ adsorption device and increasing a temperature of the exhaust flow at the passive $NO_x$ adsorption device to adjust the $NO_x$ storage characteristic toward the target $NO_x$ storage characteristic. In a refinement of this embodiment, increasing the temperature of the exhaust flow includes injecting hydrocarbons into the exhaust flow. In another embodiment, the method includes determining a regeneration condition for a particulate filter downstream of the passive $NO_x$ adsorption device and increasing a temperature of the exhaust flow across the passive $NO_x$ adsorption device to increase an $NO_2$ amount from the passive $NO_x$ adsorption device and provide an $NO_2$ based regeneration of the particulate filter.

According to another aspect, a method includes storing in an exhaust flowpath, upstream of a SCR catalyst, $NO_x$ emissions in an exhaust flow from an internal combustion engine during low exhaust temperature operation with a passive $NO_x$ adsorption device; determining a desulphation condition of the passive $NO_x$ adsorption device; and increasing a temperature of the exhaust flow in response to the desulphation condition to a sulphur-removal based temperature range to remove sulphur contaminants from the passive $NO_x$ adsorption device.

According to another aspect, a method includes storing in an exhaust flowpath, upstream of a SCR catalyst, $NO_x$ emissions from an internal combustion engine during low exhaust temperature operation with a passive $NO_x$ adsorption device. The exhaust flowpath includes an oxidation catalyst downstream of the passive $NO_x$ adsorption device and a particulate filter downstream of the oxidation catalyst and upstream of the SCR catalyst. The method includes increasing a temperature of the exhaust flow to a first light-off temperature effective for oxidation of hydrocarbons on the passive $NO_x$ adsorption device. The oxidation of hydrocarbons from the passive $NO_x$ adsorption device increases the temperature of the exhaust flow to the oxidation catalyst to a second light-off temperature effective for oxidation of hydrocarbons across the oxidation catalyst.

In another aspect, a system includes an internal combustion engine producing exhaust gas with $NO_x$ as a byproduct of operation thereof and an exhaust gas aftertreatment system fluidly coupled to the internal combustion engine. The exhaust gas aftertreatment system includes a first $NO_x$ storage means for adsorbing $NO_x$ from the exhaust gases up to a first temperature value, a second $NO_x$ storage means for adsorbing $NO_x$ from the exhaust gases above a second temperature value, and a $NO_x$ reduction means for converting $NO_x$ to $N_2$ above an effective reduction temperature threshold. The effective reduction temperature threshold and the second temperature value are both below the first temperature value.

In one embodiment, the system includes means for controlled $NO_x$ release of stored $NO_x$ from the first $NO_x$ storage means. In a refinement of this embodiment, the means for controlled $NO_x$ release of stored $NO_x$ from the first $NO_x$ storage means comprises at least one temperature generation device selected from the temperature generation devices consisting of: a fuel injector connected to at least one of the plurality of cylinders and a fuel source; a hydrocarbon injector connected to the exhaust system and a hydrocarbon source; a thermal generator; an exhaust throttle; an intake throttle; a variable geometry turbocharger capable of being positioned in a high backpressure position; a variable valve timing apparatus; and an engine operation modulating device that puts the engine in an operating state to generate increased exhaust gas temperature.

In another embodiment, the first $NO_x$ storage means comprises a passive $NO_x$ adsorption device. In a refinement of this embodiment, the passive $NO_x$ adsorption device includes at least one a passive $NO_x$ adsorber, a passive $NO_x$ adsorption substrate having an oxidation catalyst (OC) washcoat, a passive $NO_x$ adsorption substrate having an OC washcoat preferentially upstream on the passive $NO_x$ adsorption substrate, a passive $NO_x$ adsorption substrate having an OC washcoat preferentially downstream on the passive $NO_x$ adsorption substrate, an OC having a passive $NO_x$ adsorption washcoat preferentially upstream on the OC, and an OC having a passive NO adsorption washcoat preferentially downstream on the OC.

In another embodiment, the $NO_x$ reduction means comprises a first in situ thermal response that is greater than a second in situ thermal response of the second $NO_x$ storage means. In yet another embodiment, the second NO storage means includes an SCR catalyst with a filter portion downstream of the first $NO_x$ storage means and the $NO_x$ reduction means comprise an SCR catalyst element positioned downstream of the second $NO_x$ storage means.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An aftertreatment system, comprising:
a plurality of aftertreatment components in an exhaust flowpath, the plurality of aftertreatment components including a passive $NO_x$ adsorption device for adsorbing $NO_x$ from exhaust gases in the exhaust flowpath up to a first temperature value, a diesel particulate filter downstream of the first passive $NO_x$ adsorption device, and a selective catalytic reduction (SCR) catalyst downstream of the diesel particulate filter, the SCR catalyst including a $NO_x$ adsorption washcoat for adsorbing $NO_x$ from the exhaust gases above a second temperature value, wherein the SCR catalyst converts $NO_x$ to $N_2$ above an effective reduction temperature threshold and the effective reduction temperature threshold and the second temperature value are both below the first temperature value;
a reductant injector operationally coupled to a reductant source, the reductant injector operable to provide a reductant from the reductant source into the exhaust flowpath upstream of the SCR catalyst; and
at least one of a first exhaust heating apparatus upstream of the passive $NO_x$ adsorption device that is configured to increase a temperature of an exhaust gas in the exhaust flowpath upstream of the passive $NO_x$ adsorption device and a second exhaust heating apparatus downstream of the passive NOx adsorption device that is configured to increase the temperature of the exhaust gas in the exhaust flowpath upstream of the SCR catalyst.

2. The aftertreatment system of claim 1, wherein the first exhaust heating apparatuses is configured to increase the temperature of the exhaust gas upstream of the passive $NO_x$ adsorption device without oxidizing hydrocarbons upstream of the passive $NO_x$ adsorption device.

3. The aftertreatment system of claim 1, wherein at least one of the first and second exhaust heating apparatuses includes a hydrocarbon injector connected to a hydrocarbon source and to the exhaust flowpath.

4. The aftertreatment system of claim 1, wherein at least one of the first and second exhaust heating apparatuses includes a second reductant injector connected to a second reductant source and the exhaust flow path.

5. The aftertreatment system of claim 4, wherein the second reductant source includes at least one of $H_2$, CO, and hydrocarbons.

6. The aftertreatment system of claim 1, wherein at least one of the first and second exhaust heating apparatuses includes a thermal enhancer connected to a hydrocarbon source.

7. The aftertreatment system of claim 1, wherein the at least one of the first and second exhaust heating apparatuses includes a fuel injector connected to a fuel source and to at least one of an engine cylinder.

8. The aftertreatment system of claim 1, wherein the reductant includes at least one of diesel exhaust fluid, urea, and ammonia gas releasably stored on a solid storage media.

9. The aftertreatment system of claim 1, further comprising each of the first and second exhaust heating apparatuses.

10. An aftertreatment system, comprising:
a plurality of aftertreatment components in an exhaust flowpath, the plurality of aftertreatment components including a diesel oxidation catalyst with a passive $NO_x$ adsorption washcoat configured to store $NO_x$, a diesel particulate filter downstream of the diesel oxidation catalyst, and a selective catalytic reduction (SCR) catalyst downstream of the diesel particulate filter;

at least one reductant source for storing a reductant;

a reductant injector connected to the at least one reductant source operable to provide the reductant into the exhaust flowpath upstream of the SCR catalyst; and wherein the passive NOx adsorption washcoat includes a release temperature profile for releasing NOx and the SCR catalyst includes a light-off temperature, and a spacing between the passive NOx adsorption washcoat and the SCR catalyst is sized as a function of a difference between the light-off temperature and the release temperature profile.

11. The aftertreatment system of claim 10, further comprising at least one exhaust heating apparatus upstream of the diesel oxidation catalyst that is configured to increase a temperature of an exhaust gas in the exhaust flowpath upstream of the diesel oxidation catalyst in response to a $NO_x$ storage characteristic of the passive $NO_x$ adsorption washcoat deviating from a target $NO_x$ storage characteristic.

12. The aftertreatment system of claim 10, wherein the passive $NO_x$ adsorption washcoat is applied uniformly on the diesel oxidation catalyst.

13. The aftertreatment system of claim 10, wherein the passive $NO_x$ adsorption washcoat is applied only on a downstream portion of the diesel oxidation catalyst.

14. The aftertreatment system of claim 10, wherein the passive $NO_x$ adsorption washcoat is applied only on an upstream portion of the diesel oxidation catalyst.

15. An aftertreatment system, comprising:

a plurality of aftertreatment components in an exhaust flowpath, the plurality of aftertreatment components including a passive $NO_x$ adsorption device for adsorbing $NO_x$ from exhaust gases in the exhaust flowpath up to a first temperature value, a particulate filter including a first selective catalytic reduction (SCR) portion including a $NO_x$ adsorption washcoat for adsorbing $NO_x$ from the exhaust gases above a second temperature value, the particulate filter with the SCR portion being downstream of the passive $NO_x$ adsorption device, wherein the SCR portion converts $NO_x$ to $N_2$ above an effective reduction temperature threshold and the effective reduction temperature threshold and the second temperature value are both below the first temperature value;

at least one reductant source for storing at least one reductant; and a first reductant injector operable to provide a reductant into the exhaust flowpath upstream of the particulate filter with the SCR portion.

16. The system of claim 15, further comprising a SCR catalyst element downstream of the particulate filter with the SCR portion.

17. The system of claim 16, further comprising a second reductant injector operable to provide the reductant into the exhaust flow path between the particulate filter with the SCR portion and the SCR element.

18. The system of claim 17, wherein the at least one reductant includes a liquid reductant connected to the first reductant injector and a gaseous reductant connected to the second reductant injector.

19. The system of claim 17, wherein the at least one reductant includes a gaseous reductant connected to each of the first reductant injector and the second reductant injector.

20. The system of claim 15, wherein the at least one reductant comprises diesel exhaust fluid.

21. The system of claim 15, wherein the at least one reductant includes a gaseous reductant connected to the first reductant injector and a liquid reductant connected to the second reductant injector.

22. A system, comprising:

an internal system combustion engine including a plurality of cylinders operable to produce an exhaust flow into an exhaust system;

an aftertreatment system for receiving the exhaust flow comprising, in the direction of the exhaust flow, an exhaust heating apparatus, a passive $NO_x$ adsorption device, a reductant injector connected to a reductant source, and a selective catalytic reduction (SCR) catalyst;

at least one sensor associated with the aftertreatment system, the at least one sensor operable to provide a signal; and a controller structured to determine a $NO_x$ storage characteristic of the passive $NO_x$ adsorption device in response to the signal, wherein the controller is further structured to control the engine to modulate the engine operation in response to the $NO_x$ storage characteristic of the passive $NO_x$ adsorption device.

23. The system of claim 22, wherein the at least one sensor includes a first sensor operable to provide a signal indicative of a temperature associated with the passive $NO_x$ adsorption device and a second sensor operable to provide a signal indicative of a $NO_x$ amount.

24. The system of claim 22, wherein the controller is structured to interpret an $NO_2/NO_x$ amount to an inlet of the SCR catalyst and control the exhaust heating apparatus to modulate a temperature of the exhaust gas to the passive $NO_x$ adsorption device in response to a deviation of the $NO_2/NO_x$ amount from a target $NO_2/NO_x$ amount.

25. The system of claim 22, wherein the aftertreatment system includes a particulate filter between the passive $NO_x$ adsorption device and the reductant injector, and the controller is structured to determine a temperature condition of the particulate filter and control the exhaust heating apparatus to modulate a temperature of the exhaust gas to the passive $NO_x$ adsorption device in response to a deviation of the temperature condition of the particulate filter from a target temperature condition.

26. The system of claim 22, wherein the passive $NO_x$ adsorption device includes an oxidation catalyst portion.

27. The system of claim 26, wherein the oxidation catalyst portion is applied as a washcoat to the passive $NO_x$ adsorption device.

28. The system of claim 26, wherein the exhaust heating apparatus includes a hydrocarbon injector connected to a hydrocarbon source and to the aftertreatment system at an injection location for injection of hydrocarbons for oxidation across the oxidation catalyst portion of the passive $NO_x$ adsorption device.

29. The system of claim 28, wherein, in response to a degradation condition of the passive $NO_x$ adsorption device exceeding a threshold amount, the controller is structured to control the hydrocarbon injector to inject a hydrocarbon amount for oxidation across the oxidation catalyst portion that increases a temperature of the passive $NO_x$ adsorption device to a degradation reversal temperature range.

30. The system of claim 26, wherein the aftertreatment system includes a particulate filter between the passive $NO_x$ adsorption device and the reductant injector, and the controller is configured to determine a regeneration condition of the particulate filter and control the exhaust heating apparatus to heat the exhaust gas and modulate an $NO_2$ amount released by the passive NO$_x$ adsorption device for an NO$_2$ based regeneration of the particulate filter.

31. The system of claim 26, wherein the aftertreatment system includes a particulate filter between the passive NO$_x$ adsorption device and the reductant injector, and the controller is configured to determine a regeneration condition of the particulate filter and control the exhaust heating apparatus to heat the exhaust gas and modulate an O$_2$ amount released by the passive NO$_x$ adsorption device for an O$_2$ based regeneration of the particulate filter.

32. The system of claim 26, wherein the exhaust heating apparatus includes a fuel injection system configured to provide a post-combustion injection of hydrocarbons into the at least one cylinder for oxidation across the oxidation catalyst portion of the passive NO$_x$ adsorption device.

33. The system of claim 32, wherein, in response to a degradation condition of the passive NO$_x$ adsorption device exceeding a threshold amount, the controller is structured to control the fuel injection system to inject a hydrocarbon amount for oxidation across the oxidation catalyst portion that increases a temperature of the passive NO$_x$ adsorption device to a degradation reversal temperature range.

34. The system of claim 26, wherein, in response to a deviation of the NO$_x$ storage characteristic of the passive NO$_x$ adsorption device from a target NO$_x$ storage characteristic, the controller is configured to control the exhaust heating apparatus to adjust the exhaust gas temperature and modulate the NO$_x$ storage characteristic toward the target NO$_x$ storage characteristic.

35. The system of claim 22, wherein the SCR catalyst includes a filter portion.

36. The system of claim 35, wherein the aftertreatment system includes an SCR catalyst element downstream of the SCR catalyst with the filter portion.

37. The system of claim 22, wherein the aftertreatment system includes an oxidation catalyst between the exhaust heating apparatus and the passive NO$_x$ adsorption device and a particulate filter between the passive NO$_x$ adsorption device and the reductant injector.

38. The system of claim 22, wherein the aftertreatment system includes an oxidation catalyst and a particulate filter between the exhaust heating apparatus and the passive NO$_x$ adsorption device.

39. The system of claim 38, wherein the particulate filter is between the oxidation catalyst and the passive NO$_x$ adsorption device.

40. The system of claim 22, wherein the aftertreatment system includes:
an oxidation catalyst between the exhaust heating apparatus and the passive NO$_x$ adsorption device; and
a particulate filter downstream of the oxidation catalyst, wherein the passive NO$_x$ adsorption device is a coating on the particulate filter.

41. The system of claim 22, wherein the aftertreatment system includes an oxidation catalyst and a particulate filter between the passive NO$_x$ adsorption device and the reductant injector.

42. The system of claim 41, wherein the oxidation catalyst is between the passive NO$_x$ adsorption device and the particulate filter.

43. The system of claim 22, wherein:
the aftertreatment system includes an oxidation catalyst downstream of the exhaust heating apparatus;
the passive NO$_x$ adsorption device is a washcoat on the oxidation catalyst; and
the aftertreatment system further includes a particulate filter downstream of the oxidation catalyst and upstream of the reductant injector.

44. The system of claim 22, wherein the exhaust heating apparatus is selected from the group consisting of: a fuel injector connected to at least one of the plurality of cylinders and a fuel source; a hydrocarbon injector connected to the exhaust system and a hydrocarbon source; a thermal generator; a second reductant injector connected to a second reductant source; and a thermal enhancer connected to a hydrocarbon source.

45. A system, comprising:
an internal system combustion engine including a plurality of cylinders operable to produce an exhaust flow into an exhaust system;
an aftertreatment system for receiving the exhaust flow comprising, in the direction of the exhaust flow, an exhaust heating apparatus, a passive NO$_x$ adsorption device including an oxidation catalyst portion, a reductant injector connected to a reductant source, and a selective catalytic reduction (SCR) catalyst;
a plurality of sensors associated with the aftertreatment system, the plurality of sensors including at least one sensor operable to provide a signal indicative of a NO$_x$ storage characteristic of the passive NO$_x$ adsorption device; and
a controller structured to interpret the NO$_x$ storage characteristic of the passive NO$_x$ adsorption device and a target storage characteristic of the passive NO$_x$ adsorption device, the controller further being structured to control the exhaust heating apparatus to adjust the NO$_x$ storage characteristic toward the target storage characteristic.

46. The system of claim 45, wherein the exhaust heating apparatus includes a hydrocarbon injector connected to a hydrocarbon source and the controller is further structured to determine a hydrocarbon amount for dosing of hydrocarbons to the oxidation catalyst to adjust the NO$_x$ storage characteristic toward the target storage characteristic and control the hydrocarbon injector to provide the hydrocarbon amount.

47. The system of claim 46, wherein the aftertreatment system includes a particulate filter between the passive NO$_x$ adsorption device and the reductant injector, and the controller is structured to determine a regeneration condition of the particulate filter and provide a hydrocarbon amount for dosing of hydrocarbons to the oxidation catalyst to increase a temperature of the exhaust flow to the particulate filter to a particulate filter regeneration temperature range.

48. The system of claim 46, wherein the hydrocarbon injector includes at least one fuel injector connected to at least one of the plurality of cylinders of the internal combustion engine and the fuel injector is operable to provide at least a portion of the hydrocarbon amount via a post-combustion injection of fuel into the at least one cylinder.

49. The system of claim 46, wherein the hydrocarbon injector is connected to the exhaust system downstream of the plurality of cylinders.

50. The system of claim 46, wherein, in response to a sulphur contaminant accumulation on the passive NO$_x$ adsorption device exceeding a threshold amount, the controller is configured to control the hydrocarbon injector to inject a hydrocarbon amount for oxidation across the oxidation catalyst portion to increase a temperature of the passive NO$_x$ adsorption device to a desulphation temperature range.

51. The system of claim 46, wherein, in response to a deviation of the $NO_x$ storage characteristic of the passive $NO_x$ adsorption device from a target $NO_x$ storage characteristic, the controller is configured to provide a hydrocarbon amount for dosing of hydrocarbons to the oxidation catalyst to adjust the exhaust gas temperature and modulate the $NO_x$ storage characteristic toward the target $NO_x$ storage characteristic.

52. The system of claim 45, wherein the plurality of sensors include at least one sensor operable to provide a signal indicative of a temperature associated with the SCR catalyst and at least one sensor operable to provide a signal indicative of a $NO_x$ amount; and
  the controller is structured to determine the target storage characteristic of the passive $NO_x$ adsorption device in response to the temperature and the $NO_x$ amount.

53. The system of claim 49, wherein the controller is configured to control the engine to modulate the engine-out $NO_x$ amount in response to the $NO_x$ storage characteristic of the passive $NO_x$ adsorption device.

54. The system of claim 45, wherein the oxidation catalyst portion is applied as a washcoat to the passive $NO_x$ adsorption device.

55. The system of claim 45, wherein the SCR catalyst includes a filter portion.

56. The system of claim 55, wherein the aftertreatment system includes an SCR catalyst element downstream of the SCR catalyst with the filter portion.

57. The system of claim 45, wherein the oxidation catalyst includes a substrate and the passive $NO_x$ adsorption device includes a washcoat applied to the substrate.

58. The system of claim 57, wherein the washcoat for the passive $NO_x$ adsorption device is applied uniformly on the entire substrate of the oxidation catalyst.

59. The system of claim 57, wherein the washcoat for the passive $NO_x$ adsorption device is applied preferentially on a downstream portion of the substrate of the oxidation catalyst.

60. The system of claim 57, wherein the washcoat for the passive $NO_x$ adsorption device is applied preferentially on an upstream portion of the substrate of the oxidation catalyst.

61. A method, comprising:
  storing in an exhaust flowpath, upstream of a selective catalytic reduction (SCR) catalyst, $NO_x$ emissions in an exhaust flow from an internal combustion engine during low exhaust temperature operation with a passive NOx adsorption device;
  determining a NOx storage characteristic of the passive NOx adsorption device; and
  modulating a $NO_x$ output of the internal combustion engine in response to the $NO_x$ storage characteristic, wherein modulating the $NO_x$ output includes increasing the $NO_x$ output in response to the $NO_x$ storage characteristic being greater than a first threshold and reducing the $NO_x$ output in response to the $NO_x$ storage characteristic being less than a second threshold.

62. The method of claim 61, further comprising determining a target storage characteristic of the passive $NO_x$ adsorption device and increasing a temperature of the exhaust flow at the passive $NO_x$ adsorption device to adjust the $NO_x$ storage characteristic toward the target $NO_x$ storage characteristic.

63. The method of claim 62, wherein increasing the temperature of the exhaust flow includes injecting hydrocarbons into the exhaust flow.

64. The method of claim 61, further comprising:
  determining a regeneration condition for a particulate filter downstream of the passive $NO_x$ adsorption device; and
  increasing a temperature of the exhaust flow across the passive $NO_x$ adsorption device to increase an $NO_2$ amount from the passive $NO_x$ adsorption device and provide an $NO_2$ based regeneration of the particulate filter.

65. A method, comprising:
  storing in an exhaust flowpath, upstream of a selective catalytic reduction (SCR) catalyst, $NO_x$ emissions in an exhaust flow from an internal combustion engine during low exhaust temperature operation with a passive $NO_x$ adsorption device;
  determining a desulphation condition of the passive $NO_x$ adsorption device; and
  increasing a temperature of the exhaust flow in response to the desulphation condition to a sulphur-removal based temperature range to remove sulphur contaminants from the passive $NO_x$ adsorption device.

66. A method, comprising:
  storing in an exhaust flowpath, upstream of a selective catalytic reduction (SCR) catalyst, $NO_x$ emissions from an internal combustion engine during low exhaust temperature operation with a passive $NO_x$ adsorption device for adsorbing $NO_x$ from exhaust gases in the exhaust flowpath up to a first temperature value, the exhaust flowpath further comprising an oxidation catalyst downstream of the passive $NO_x$ adsorption device and a particulate filter downstream of the oxidation catalyst and upstream of the SCR catalyst, the SCR catalyst including a $NO_x$ adsorption washcoat for adsorbing $NO_x$ from the exhaust gases above a second temperature value; and
  increasing a temperature of the exhaust flow to a first light-off temperature effective for oxidation of hydrocarbons on the passive $NO_x$ adsorption device, wherein the oxidation of hydrocarbons from the passive $NO_x$ adsorption device increases the temperature of the exhaust flow to the oxidation catalyst to a second light-off temperature effective for oxidation of hydrocarbons across the oxidation catalyst; and
  converting $NO_x$ to $N_2$ with the SCR catalyst above an effective reduction temperature threshold, wherein the effective reduction temperature threshold and the second temperature value are both below the first temperature value.

67. A system, comprising:
  an internal combustion engine producing exhaust gas with $NO_x$ as a byproduct of operation thereof;
  an exhaust gas aftertreatment system fluidly coupled to the internal combustion engine, the exhaust gas aftertreatment system comprising:
    a first $NO_x$ storage means for adsorbing $NO_x$ from the exhaust gases up to a first temperature value;
    a second $NO_x$ storage means for adsorbing $NO_x$ from the exhaust gases above a second temperature value;
    a $NO_x$ reduction means for converting $NO_x$ to $N_2$ above an effective reduction temperature threshold; and
    wherein the effective reduction temperature threshold and the second temperature value are both below the first temperature value.

68. The system of claim 67, further comprising means for controlled $NO_x$ release of stored $NO_x$ from the first $NO_x$ storage means.

69. The system of claim 67, wherein the means for controlled $NO_x$ release of stored $NO_x$ from the first $NO_x$ storage means comprises at least one temperature generation device selected from the temperature generation devices consisting of: a fuel injector connected to at least one of the plurality of cylinders and a fuel source; a hydrocarbon injector connected to the exhaust system and a hydrocarbon source; a thermal generator; an exhaust throttle; an intake throttle; a variable geometry turbocharger capable of being positioned in a high backpressure position; a variable valve timing apparatus; and an engine operation modulating device that puts the engine in an operating state to generate increased exhaust gas temperature.

70. The system of claim 67, wherein the first $NO_x$ storage means comprises a passive $NO_x$ adsorption device.

71. The system of claim 70, wherein the passive $NO_x$ adsorption device includes at least one a passive $NO_x$ adsorber, a passive $NO_x$ adsorption substrate having an oxidation catalyst (OC) washcoat, a passive $NO_x$ adsorption substrate having an OC washcoat preferentially upstream on the passive $NO_x$ adsorption substrate, a passive $NO_x$ adsorption substrate having an OC washcoat preferentially downstream on the passive $NO_x$ adsorption substrate, an OC having a passive $NO_x$ adsorption washcoat preferentially upstream on the OC, and an OC having a passive $NO_x$ adsorption washcoat preferentially downstream on the OC.

72. The system of claim 67, wherein the $NO_x$ reduction means comprises a first in situ thermal response that is greater than a second in situ thermal response of the second $NO_x$ storage means.

73. The system of claim 67, wherein the second $NO_x$ storage means includes an SCR catalyst with a filter portion downstream of the first $NO_x$ storage means and the $NO_x$ reduction means comprise an SCR catalyst element positioned downstream of the second $NO_x$ storage means.

* * * * *